United States Patent
Lee et al.

(10) Patent No.: US 12,284,128 B2
(45) Date of Patent: Apr. 22, 2025

(54) DEVICE AND METHOD FOR DETECTING INTERFERENCE BETWEEN BASE STATIONS IN WIRELESS COMMUNICATION SYSTEM

(71) Applicant: Samsung Electronics Co., Ltd., Suwon-si (KR)

(72) Inventors: Dongjae Lee, Suwon-si (KR); Hyuncheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/625,995

(22) PCT Filed: Jul. 9, 2020

(86) PCT No.: PCT/KR2020/009029
§ 371 (c)(1),
(2) Date: Jan. 10, 2022

(87) PCT Pub. No.: WO2021/006666
PCT Pub. Date: Jan. 14, 2021

(65) Prior Publication Data
US 2022/0278801 A1    Sep. 1, 2022

(30) Foreign Application Priority Data

Jul. 9, 2019   (KR) .................. 10-2019-0082672
May 15, 2020   (KR) .................. 10-2020-0058076

(51) Int. Cl.
*H04W 4/00*   (2018.01)
*H04L 5/00*   (2006.01)

(52) U.S. Cl.
CPC .......... *H04L 5/0051* (2013.01); *H04L 5/0073* (2013.01)

(58) Field of Classification Search
CPC .. H04L 5/0051; H04L 5/0073; H04J 11/0056; H04B 17/318
See application file for complete search history.

(56) References Cited

U.S. PATENT DOCUMENTS 9,338,031 B2    5/2016   Zhang et al.
2011/0167391 A1*   7/2011   Momeyer ............... G06F 3/038
715/863

(Continued)

FOREIGN PATENT DOCUMENTS

EP   1389835 A1 *   2/2014   ............. H04B 3/54
EP   2711736 B1 *   11/2016   ............. G01S 19/21

(Continued)

OTHER PUBLICATIONS

M. Kazemian, P. Varahram, S. J. B. Hashim, B. B. M. Ali, S. Mohammady and N. Sulaiman, "Peak-to-average power ratio reduction based on Cross-Correlation in OFDM systems," 16th International Conference on Advanced Communication Technology, Pyeongchang, Korea (South), 2014, pp. 244-248. (Year: 2014).*

(Continued)

*Primary Examiner* — Thai Dinh Hoang
(74) *Attorney, Agent, or Firm* — Jefferson IP Law, LLP

(57) ABSTRACT

Disclosed is a 5th generation (5G) or pre-5G communication system for supporting a data transmission rate higher than that of a 4th generation (4G) communication system, such as long term evolution (LTE). The purpose of the disclosure is to detect interference between base stations in a wireless communication system, and a base station operating method can comprise the steps of: receiving signals through a resource allocated for reference signals (RSs) for interference measurement; detecting at least one RS on the basis of (Continued)

the signals; and determining that at least one among the RSs has been received on the basis of cross-correlation values between candidate RSs.

18 Claims, 24 Drawing Sheets

(56) References Cited

U.S. PATENT DOCUMENTS

| | | | |
|---|---|---|---|
| 2013/0101060 A1 | 4/2013 | Cendrillon et al. | |
| 2013/0102256 A1 | 4/2013 | Cendrillon et al. | |
| 2013/0322289 A1 | 12/2013 | Zhu et al. | |
| 2015/0245193 A1* | 8/2015 | Xiong | H04W 4/80 370/328 |
| 2016/0344459 A1* | 11/2016 | Chen | H04B 7/0868 |
| 2017/0317816 A1 | 11/2017 | Lei et al. | |
| 2018/0368142 A1* | 12/2018 | Liou | H04W 74/0808 |
| 2021/0203448 A1* | 7/2021 | Xia | H04L 27/26 |

FOREIGN PATENT DOCUMENTS

| | | | |
|---|---|---|---|
| EP | 3406062 B1 * | 2/2020 | H04B 1/1027 |
| KR | 10-2013-0119788 A | 11/2013 | |
| KR | 10-2014-0072891 A | 6/2014 | |
| WO | WO-2018060969 A1 * | 4/2018 | H04L 27/2085 |
| WO | WO-2021006666 A1 * | 1/2021 | H04B 17/318 |

OTHER PUBLICATIONS

E. Peralta et al., "Reference Signal Design for Remote Interference Management in 5G New Radio," 2019 European Conference on Networks and Communications (EuCNC), Valencia, Spain, 2019, pp. 559-564, doi: 10.1109/EuCNC.2019.8802014. (Year: 2019).*
Nokia et al., Further evaluation results on RIM-RS design, 3GPP TSG RAN WG1 Ad-Hoc Meeting 1901, R1-1900840 Taipei, Taiwan, Jan. 21-25, 2019.
3GPP TR 38.866, V16.0.0, Technical Specification Group Radio Access Network; Study on remote interference management for NR (Release 16) Dec. 2018.
European Search Report dated Aug. 1, 2022, issued in European Patent Application No. 20837150.0.
Ericsson, On RIM RS resource and configurations, 3GPP TSG RAN WG1 Meeting Ad-Hoc Meeting 1901, R1-1903034, Feb. 25-Mar. 1, 2019, Athens, Greece.
CMCC, Feature lead summary for NR RIM, 3GPP TSG RAN WG1 Adhoc Meeting, R1-1901309, Jan. 21-25, 2019, Taipei, Taiwan.
Indian Office Action dated Dec. 29, 2023; Indian Appln. No. 202217002069.
European Search Report dated Mar. 13, 2024; European Appln. No. 20 837 150.0-1206.
Korean Office Action with English translation dated Oct. 21, 2024; Korean Appln. No. 10-2020-0058076.

* cited by examiner

DEVICE AND METHOD FOR DETECTING INTERFERENCE BETWEEN BASE STATIONS IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/009029, filed on Jul. 9, 2020, which is based on and claims priority of a Korean patent application number 10-2019-0082672, filed on Jul. 9, 2019, in the Korean Intellectual Property Office, and of a Korean patent application number 10-2020-0058076, filed on May 15, 2020, in the Korean Intellectual Property Office, the disclosure of each of which is incorporated by reference herein in its entirety.

TECHNICAL FIELD

The disclosure generally relates to a wireless communication system and, more particularly, to a device and a method for detecting interference between base stations in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In various wireless communication systems including a 5G system, interference may occur any time between devices (e.g., a base station and a terminal) performing wireless communication any time. Interference types may be variously defined depending on the relationship between devices involved in interference. Since interference causes deterioration in communication quality, it is preferable to properly control interference.

DISCLOSURE OF INVENTION

Technical Problem

Based on the foregoing description, the disclosure provides a device and a method for effectively detecting interference between base stations in a wireless communication system.

Further, the disclosure provides a device and a method for improving interference detection performance in a wireless communication system.

In addition, the disclosure provides a device and a method for reducing the probability of misdetermining a signal for interference detection in a wireless communication system.

Solution to Problem

According to various embodiments of the disclosure, an operating method of a base station in a wireless communication system may include receiving signals through a resource allocated for reference signals (RSs) for interference measurement, detecting at least one RS, based on the signals, and determining that at least one among the at least one RS is received, based on cross-correlation values between candidate RSs.

According to various embodiments of the disclosure, a base station in a wireless communication system may include a transceiver and at least one processor connected to the transceiver. The at least one processor may receive signals through a resource allocated for reference signals (RSs) for interference measurement, may detect at least one RS based on the signals, and may determine that at least one among the at least one RS is received, based on cross-correlation values between candidate RSs.

Advantageous Effects of Invention

A device and a method according to various embodiments of the disclosure may reduce the probability of misdetermining an interference signal.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure described below relates to a device and a method for detecting interference between base stations in a wireless communication system. Specifically, the disclosure describes a technique for reducing the probability of wrongly determining existence of a signal for measuring interference in a wireless communication system.

As used herein, terms referring to signals, terms referring to channels, terms referring to control information, terms referring to network entities, terms referring to components of a device, and the like are used for convenience of explanation. Therefore, the disclosure is not limited by the following terms, and other terms having equivalent technical meanings may be used.

In the disclosure, to determine whether a specific condition is satisfied or fulfilled, the expression of greater than or less than is used, which is only for illustration and does not exclude 'equal to or greater than' or 'less than or equal to'. A condition expressed with 'equal to or greater than' may be replaced by that with 'greater than', a condition expressed with 'less than or equal to' may be replaced by that with 'less than', and a condition expressed with 'equal to or greater than and less than' may be replaced by that with 'greater than and less than or equal to'.

Further, although the disclosure illustrates various embodiments using terms used in some communication standards (e.g., 3rd Generation Partnership Project (3GPP)), these standards are provided merely for convenience of description. Various embodiments of the disclosure may be easily modified and applied to other communication systems.

Figure 1:
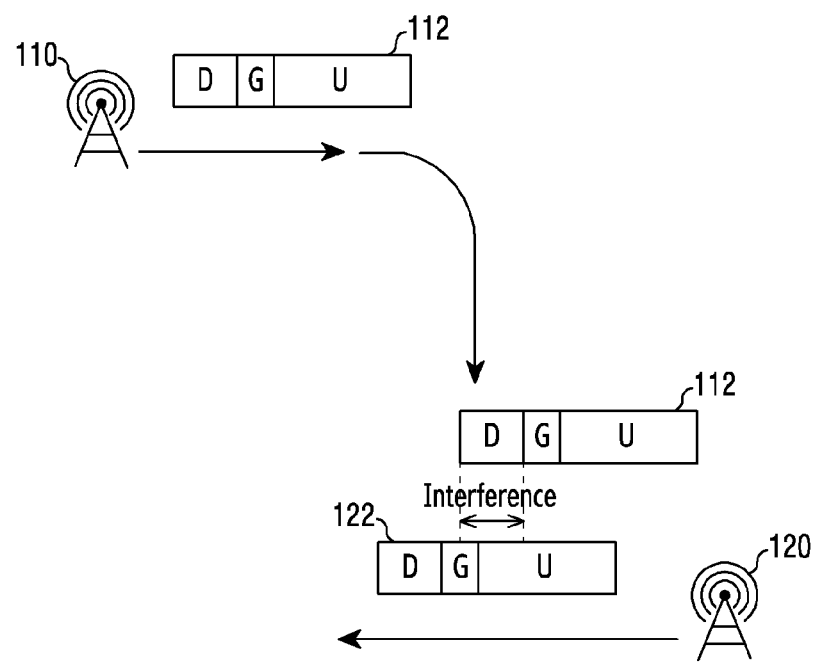
FIG. 1 illustrates a wireless communication system according to various embodiments of the disclosure.

FIG. 1 illustrates a wireless communication system according to various embodiments of the disclosure. Referring to FIG. 1, the wireless communication system includes a base station 110 and a base station 120. Although FIG. 1 shows the base station 110 and the base station 120, other base stations may be further included.

The base station 110 and the base station 120 are pieces of network infrastructure that provides wireless access for terminals. The base station 110 and the base station 120 have coverage defined as a certain geographic area based on the distance over which the base station 110 and the base station 120 can transmit a signal. The base station 110 and the base station 120 may be referred to as an access point (AP), an eNodeB (eNB), a 5th-generation (5G) node, a next-generation nodeB (gNB), a wireless point, a transmission/reception point (TRP), or other terms with equivalent technical meanings, in addition to a base station. When necessary, the base station may be referred to as a cell.

The base station 110 may transmit or receive signals according to frames 112. The base station 120 may transmit or receive signals according to frames 122. In the frames 112 or the frames 122, 'D' denotes a downlink interval, 'G' denotes a gap interval, and 'U' denotes an uplink interval. A downlink interval may include at least one downlink subframe, slot, or symbol, and an uplink interval may include at least one uplink subframe, slot, or symbol. A gap interval may be understood as a flexible slot or symbol, or at least one symbol of a special subframe excluding a downlink pilot time slot (DwPTS) and an uplink pilot time slot (UpPTS).

Under certain climatic conditions, the Earth's atmosphere at high altitudes has low density and exhibits a low refractive index, which causes a signal to bend toward the Earth. In this situation, refraction and reflection occur on the boundary of the atmosphere having a low refractive index, and a signal is transmitted along a layer having a relatively high refractive index. Due to this propagation method called atmospheric waveguide, a radio signal experiences slight attenuation and reaches a long distance far beyond a normal radiation range. This phenomenon usually occurs in seasonal changes between spring and summer and between summer and autumn on a continent, and may occur in winter on the coast. It is known that this phenomenon occurs over a frequency range from 0.3 GHz to 30 GHz.

When a time division duplex (TDD) scheme in which one spectrum includes an uplink and a downlink is used, a gap interval exists to prevent interference between the uplink and the downlink. However, when the foregoing waveguide phenomenon occurs, a radio signal may travel a very long distance, and the propagation delay time of the radio signal may exceed the length of the gap interval. In this case, a downlink signal of the base station 110 causing interference (hereinafter, referred to as an 'aggressor') may act as interference in an uplink interval of the distant base station 120 (hereinafter, referred to as a 'victim'). This interference may be referred to as remote interference. The more distant the aggressor is from the victim, the further delayed signal the victim receives in uplink symbols after the gap interval, the more uplink symbols of the victim are subjected to interference.

To determine a base station that transmits an interference signal, base stations may transmit a signal for measurement in a downlink interval and may simultaneously receive a signal in an uplink interval, thereby determining which base station is an interference source. A signal for measuring interference between base stations may be referred to as a 'remote interference management (RIM) reference signal (RS)'. Therefore, a receiving base station needs a technique for detecting which RIM RS is received.

A RIM RS may include one sequence in a candidate sequence set including a plurality of sequences. Here, a RIM RS including a sequence means that the RIM RS is generated based on the sequence, for example, the RIM RS may be obtained by modulating the sequence (e.g., quadrature phase shift keying (QPSK) modulation). For example, sequences may be defined based on a Gold sequence having a robust alignment characteristic. Accordingly, an operation of detecting a RIM RS refers to an operation of determining which sequence a RIM RS transmitted by a sender includes among candidate sequences. That is, detection of a RIM RS is an operation of determining an index k of a sequence included in the received RIM RS, and in the disclosure, 'detect a RIM RS' and 'detect a sequence' may be interchangeably used with the same meaning. When defining an index of a plurality of candidate sequences as k, a RIM RS including a sequence of index k may be referred to as 'RIM RS k'.

Figure 2:
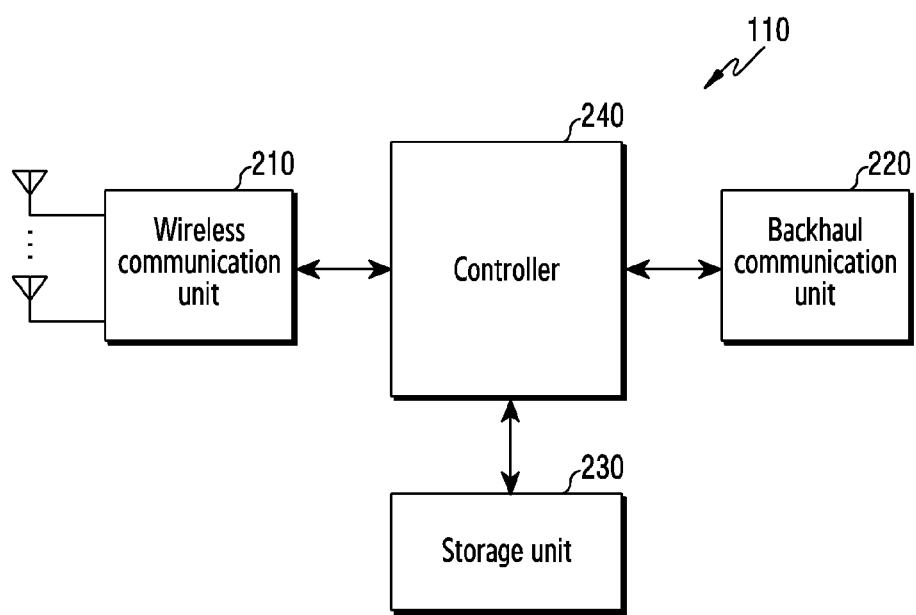
FIG. 2 illustrates the configuration of a base station in a wireless communication system according to various embodiments of the disclosure.

FIG. 2 illustrates the configuration of a base station in a wireless communication system according to various embodiments of the disclosure. The configuration illustrated in FIG. 2 may be construed as the configuration of the base station 110 or 120. The terms 'unit', '-or/er', and the like used herein indicate a unit for processing at least one function or operation, which may be implemented by hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream.

The wireless communication unit 210 upconverts a baseband signal into a radio-frequency (RF) band signal, and may transmit the RF band signal through an antenna. The wireless communication unit 210 downconverts an RF band signal, received through the antenna, into a baseband signal. To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements.

From the aspect of hardware, the wireless communication unit 210 may include a digital unit and an analog unit, and the analog unit may include a plurality of sub-units according to operating power, operating frequency, or the like. The digital unit may be configured as at least one processor (e.g., a digital signal processor (DSP)).

As described above, the wireless communication unit 210 transmits and receives a signal. Accordingly, part or all of the wireless communication unit 210 may be referred to as a transmitter, a receiver, or a transceiver. In the following description, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the base station to another node, for example, another access node, another base station, a higher node, a core network, or the like, into a physical signal, and converts a physical signal, which is received from another node, into a bit stream.

The storage unit 230 stores data, such as a default program, an application, and setting information, for the operation of the base station. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. The controller 240 may perform functions of a protocol stack required by the communication standards. According to another embodiment, the protocol stack may be included in the wireless communication unit 210. To this end, the controller 240 may include at least one processor. According to various embodiments, the controller 240 may control the base station to perform operations according to various embodiments to be described below.

According to an embodiment, the controller 240 detects whether a RIM RS is received and an index of a sequence included in the received RIM RS. The controller 240 may determine which sequence the received RIM RS includes using signals extracted from a resource to which the RIM RS is mapped. For example, the controller 240 may calculate channel power and noise power corresponding to each sequence candidate, may identify at least one sequence of the received RIM RS, based on the channel power and the noise power, and may perform verification to determine whether the identified at least one sequence is finally received.

For convenience of description, a base station that transmits a RIM RS is referred to as a 'sender', and a base station that determines an interference source through a RIM RS is referred to as a 'detector'.

Figure 3:
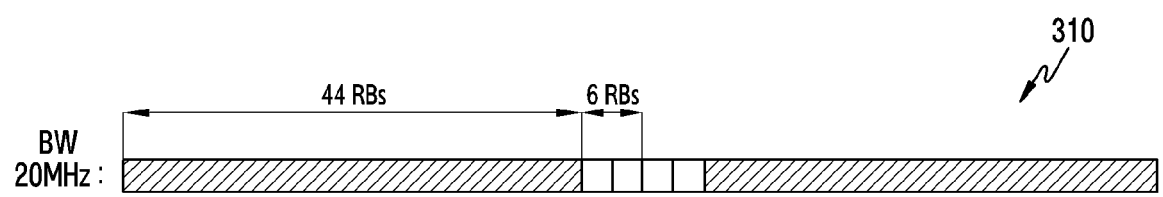
FIG. 3 illustrates an example of mapping a remote interference management (RIM) reference signal (RS) in a wireless communication system according to various embodiments of the disclosure.
Figure 3:
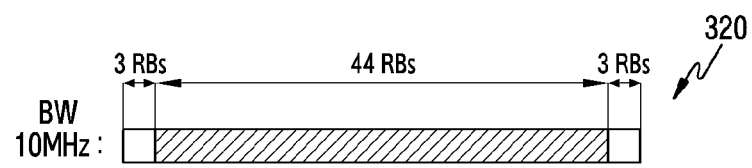

A RIM RS transmitted and received according to various embodiments of the disclosure may be designed as follows. FIG. 3 illustrates an example of mapping a RIM RS in a wireless communication system according to various embodiments of the disclosure. Referring to FIG. 3, resources occupied by the RIM RS within a bandwidth (BW) of a sender are defined. FIG. 3 illustrates a first case 310 where the bandwidth of the sender is 20 MHz and a second case 320 where the bandwidth of the sender is 10 MHz. In the first case 310 where the bandwidth is 20 MHz, the number of available resource blocks (RBs) is 100. In this case, one RIM RS is mapped to 44 RBs in a low frequency region within the bandwidth, and one RIM RS is mapped to 44 RBs in a high frequency region. In the second case 320 where the bandwidth is 10 MHz, the number of available RBs is 50. In this case, one RIM RS is mapped to 44 RBs in a middle frequency region.

The RIM RS illustrated in FIG. 3 is designed in view of various combinations of a center frequency and a bandwidth of the sender and a detector. The RS designed in FIG. 3 may be detected as illustrated below in FIGS. 4A to 4C according to a center frequency and a bandwidth.

Figure 4A:
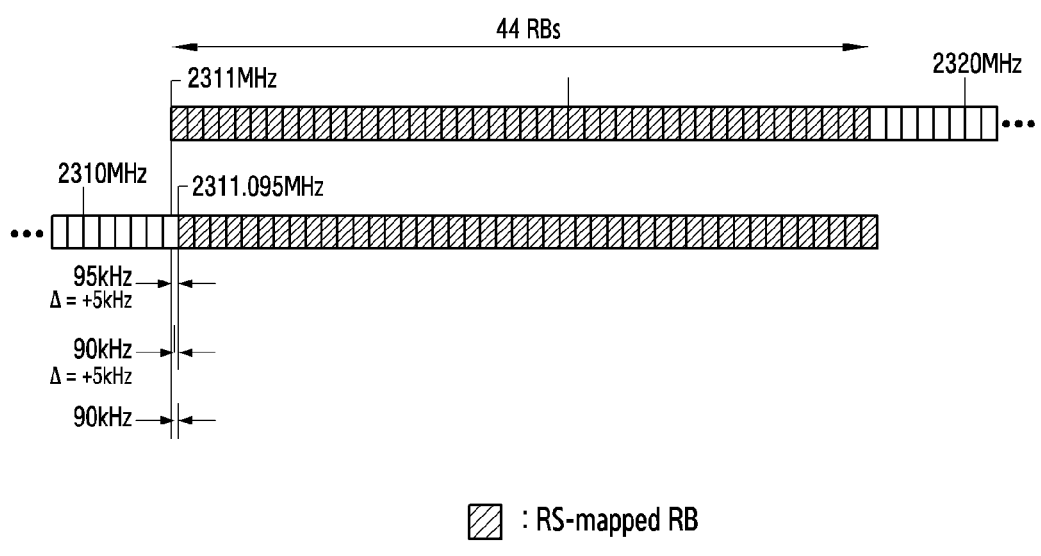
FIGS. 4A, 4B, and 4C illustrate examples of a relative position of a RIM RS according to a carrier frequency in a wireless communication system according to various embodiments of the disclosure.
Figure 4B:
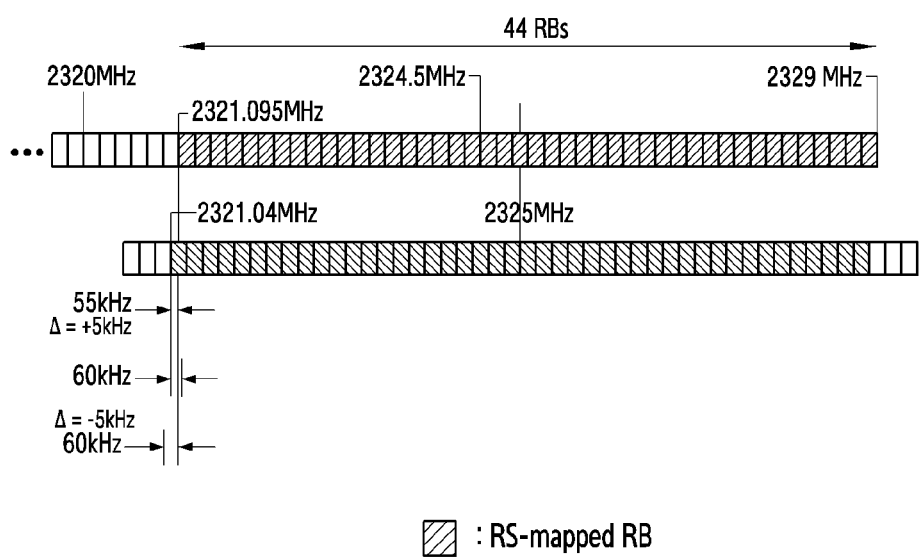
Figure 4C:
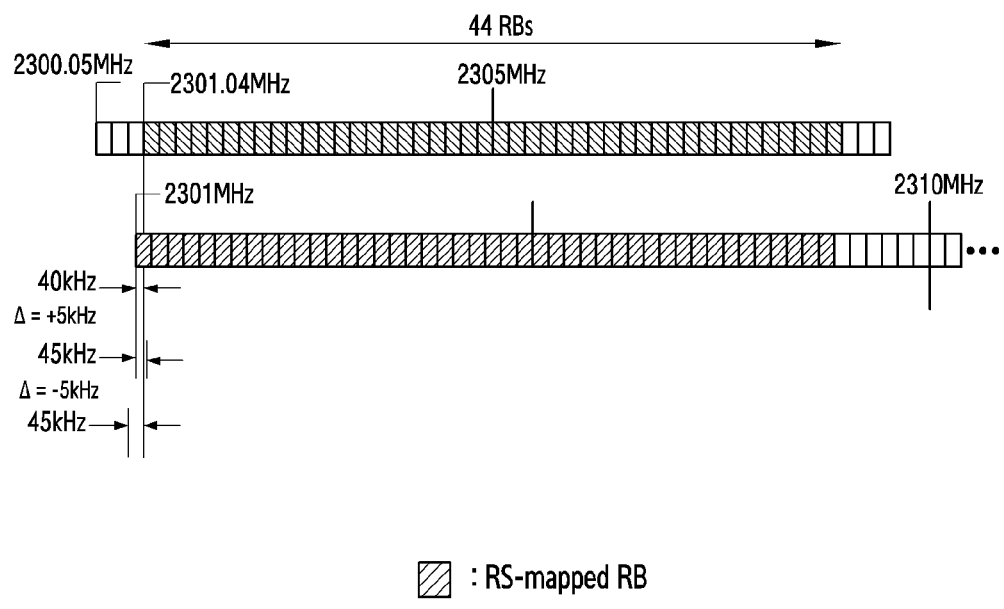

FIGS. 4A to 4C illustrate examples of a relative position of a RIM RS according to a carrier frequency in a wireless communication system according to various embodiments of the disclosure.

FIG. 4A illustrates a signal in a band having a center frequency of 2310 MHz and a bandwidth of 20 MHz and a signal in a band having a center frequency of 2320 MHz and a bandwidth of 20 MHz. For a detector in a band having a center frequency of 2310 MHz to detect a signal transmitted at a center frequency of 2320 MHz, a RIM RS is mapped to a low band of the center frequency 2320 MHz. To maximize the number of RBs to which the RIM RS is mapped, it is preferable that a reception signal is located in the frequencies of RBs to which from a tone corresponding to the lowest frequency 2311 MHz to the highest frequency tone of the center frequency 2310 MHz belong. Accordingly, the number of RBs may be selected to be 44. On the contrary, for a detector in a band having a center frequency of 2320 MHz to detect a signal transmitted at a center frequency of 2310 MHz, the RIM RS is mapped to a high band of the center frequency 2310 MHz. To maximize the number of RBs for the RIM RS, it is preferable that from a tone corresponding to the lowest frequency 2311.095 MHz to the highest frequency tone of the center frequency 2310 MHz are mapped to a RIM RS. Accordingly, the number of RBs may be selected to be 44.

FIG. 4B illustrates a signal in a band having a center frequency of 2320 MHz and a bandwidth of 20 MHz and a signal in a band having a center frequency of 2325 MHz and a bandwidth of 10 MHz. For a detector in a band having a center frequency of 2320 MHz to detect a signal transmitted at a center frequency of 2325 MHz, it is identified that a RIM RS is preferably not mapped to three RBs in a high band of the center frequency 2325 MHz. FIG. 4C illustrates a signal in a band having a center frequency of 2305 MHz and a bandwidth of 10 MHz and a signal in a band having a center frequency of 2310 MHz and a bandwidth of 20 MHz. For a detector in a band having a center frequency of 2310 MHz to detect a signal transmitted at a center frequency of 2305 MHz, it is identified that a RIM RS is preferably not mapped to three RBs in a low band of the center frequency 2305 MHz. Referring to FIGS. 4B and 4C, it is identified that a base station using a 10 MHz bandwidth preferably maps the RIM RS to 44 RBs in the middle.

Figure 5:
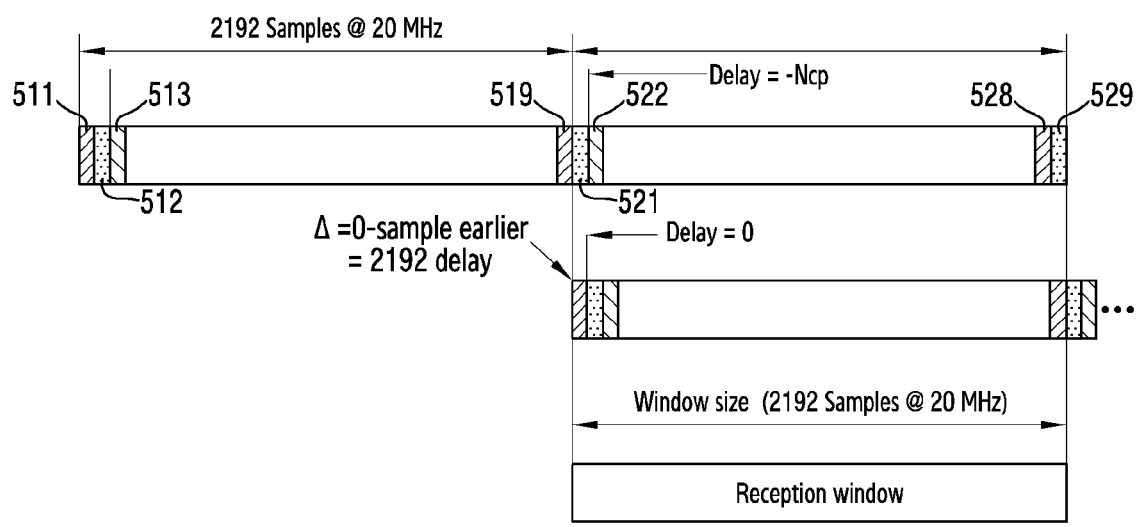
FIG. 5 illustrates an example of a reception window for detecting a RIM RS in a wireless communication system according to various embodiments of the disclosure.

FIG. 5 illustrates an example of a reception window for detecting a RIM RS in a wireless communication system according to various embodiments of the disclosure.

Referring to FIG. 5, a RIM RS has a circular characteristic that a long cyclic prefix (CP) (e.g., two normal CPs) is added to two net OFDM symbols. Specifically, Ncp samples 519 at a rear end of a first net OFDM symbol are added as a CP 511 of the first net OFDM symbol, and Ncp samples 529 at a rear end of a second net OFDM symbol are added as a CP 521 of the second net OFDM symbol. Here, Ncp samples 512 at a front end of the first net OFDM symbol are the same as the CP 521 of the second net OFDM symbol. The Ncp samples 512 at the front end of the first net OFDM symbol and the Ncp samples 513 following the Ncp samples 512 are the same as the CP 521 of the second net OFDM symbol and Ncp samples 522 at a front end of the second net OFDM symbol. As a result, the structure of the RIM RS may be understood as the same as adding a CP with a 2×Ncp length to a double-length net OFDM symbol.

According to the foregoing structure, when a bandwidth is 20 MHz and reception is performed with a 0 to 2192 sample delay, the RIM RS may be detected without inter-symbol interference (ISI) within a reception window. A detector may receive a first OFDM symbol or a second OFDM symbol through the reception window and may remove Ncp samples at the front end from the received OFDM symbol, thereby detecting RIM RS. For example, when the first OFDM symbol is received with a delay of 0, that is, no delay, within the reception window, that is, when the detector wholly receives the first symbol in the reception window, the RIM RS may be detected with a reception delay of 0. In another example, when the detector wholly receives the second symbol in the reception window, the RIM RS may be detected with a reception delay of −Ncp or a delay of Nfft (=FFT size)−Ncp.

As described above, the detector may detect the RIM RS transmitted by a sender. To detect the RIM RS, the detector may estimate channel power and noise power in a resource (e.g., RBs) to which the RIM RS is mapped for each sequence and may then compare the ratio of the channel power and the noise power for each sequence with a threshold value (e.g., TPAPR), thereby determining whether a corresponding sequence has been transmitted.

Although detection performance for a specific RIM RS is important, wrong determination may be made due to noise reception even though no RIM RS is received. A situation in which wrong determination occurs may be referred to as a 'false alarm (FA)'. For example, when the sender transmits no sequence but the detector determines that a specific sequence is received, this is a situation in which an FA occurs. Alternatively, when the sender transmits one sequence but the detector determines that two or more sequences are received, this is also a situation in which an FA occurs. A probability that an FA occurs, that is, a probability that a sequence not transmitted is wrongly determined to be detected may be referred to as an 'FA probability'.

Further, in detecting a RIM RS, a probability that a sequence transmitted by the sender is correctly detected by the detector may be referred to as a 'detection probability'. The detection probability of a RIM RS k may be expressed as 'Pdet(k)'. A detection probability may be defined by a worst case detection probability and an average detection probability. The worst detection probability is the smallest value of $P_{det}(k)$, and the average detection probability is the average value of $P_{det}(k)$. The detection probability may be expressed as a function for a specific sequence.

It is necessary to improve detection performance while maintaining an FA probability of a specific level or less. Further, it is necessary to improve detection performance while maintaining a probability of error detection of determining that a RIM RS q(≠k) is received at a specific level or lower, that is, maintaining a detection probability above a specific level, when a RIM RS k is received.

Figure 6:
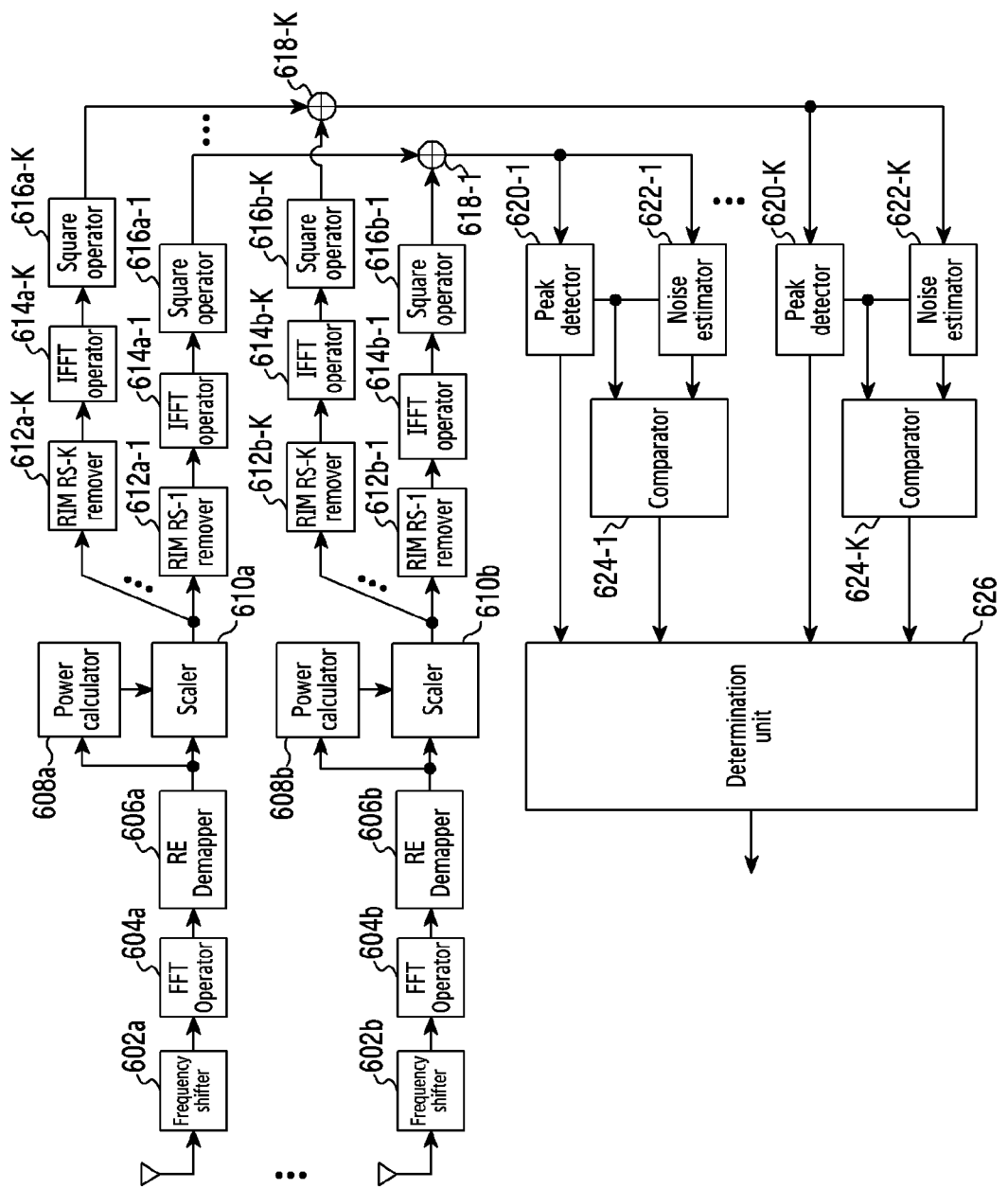
FIG. 6 illustrates a functional configuration of a base station for detecting a RIM RS in a wireless communication system according to various embodiments of the disclosure.

FIG. 6 illustrates a functional configuration of a base station for detecting a RIM RS in a wireless communication system according to various embodiments of the disclosure. Components illustrated in FIG. 6 may be understood as part of the wireless communication unit 210 and the controller 240 illustrated in FIG. 2.

A frequency shifter 602a adjusts the frequency of a signal received through an antenna. A center frequency of a sender and a center frequency of a detector may not be integer multiples of a tone interval (e.g., 15 kHz in FIGS. 4A, 4B, and 4C). Therefore, it is necessary to align the received signal on a frequency grid corresponding to a tone interval of the detector. Accordingly, the frequency shifter 602a aligns the signal passing through the reception antenna to the frequency grid. Grid misalignment may occur because the sender transmits the RIM RS as a downlink signal and the detector processes the RIM RS as an uplink signal. Since a base station transmits a downlink signal without frequency shifting but a terminal shifts an uplink signal by 7.25 kHz up, the base station receiving the uplink signal performs a −7.25 kHz downshift in compensation for the shift, and thus grid misalignment may occur. Further, since a channel spectrum of the sender and a channel spectrum of the receiver may have different widths and center frequencies, grid misalignment may occur. However, when a frequency shift is not applied between an uplink signal and a downlink signal, the frequency shifter 602a may be omitted.

An FFT operator 604a performs an FFT operation on a signal. That is, the FFT operator 604a converts a signal in a time domain into a signal in a frequency domain through the FFT operation. Here, the number of samples on which the FFT operation is performed is Nfft. Although not shown, an operation of removing samples corresponding to a CP may be further performed before the FFT operation.

A resource element (RE) demapper 606a extracts RIM RSs. That is, the RE demapper 606a demaps a signal from REs (e.g., 44 RBs*12 RE/RB=528 REs) to which the RIM RSs are mapped from a signal in the frequency domain.

A power calculator 608a calculates power for a RIM RS. The power calculator 608a may calculate power using the levels of signals extracted from REs to which the RIM RS is mapped. Information about the calculated power is provided to the scaler 610a.

The scaler 610a adjusts a power value for a RIM RS in view of a combination. For example, the scaler 610a may divide a power value by a small number when the power value is small, and may divide a power value by a large number when the power value is large. Values for RIM RSs processed for individual antennas are then summed, and when noise powers of signals received through the individual antennas are not uniform, the scaler 610a needs to operate to combine the signals with the same noise power level.

The foregoing frequency shifter 602a, the FFT operator 604a, the RE demapper 606a, the power calculator 608a, and the scaler 610a process a signal received through one antenna. Accordingly, a frequency shifter 602b, an FFT operator 604b, an RE demapper 606b, a power calculator 608b, and a scaler 610b that process a signal received through a different antenna may perform the same operations as those of the frequency shifter 602a, the FFT operator 604a, the RE demapper 606a, the power calculator 608a, and the scaler 610a. Although FIG. 6 shows that the frequency shifter 602b, the FFT operator 604b, the RE demapper 606b, the power calculator 608b, and the scaler 610b are component groups separate from the frequency shifter 602a, the FFT operator 604a, the RE demapper 606a, the power calculator 608a, and the scaler 610a, this configuration is only for functional illustration. The above components may be actually configured as separate component groups, or one component group may repeatedly process signals received through a plurality of antennas.

When the number of candidate sequences that can be included in a RIM RS under consideration is K, the detector attempts to detect K RIM RSs. Accordingly, a post-scaling operation is repeatedly performed for the K candidate sequences. For convenience of description, operations related to one sequence, for example, a sequence of index 1, are representatively described.

A RIM RS-1 remover 612a-1 removes a sequence of index 1 from a scaled received signal. Accordingly, a RIM RS is removed from the scaled received signal, and the sum of a channel component and a noise and interference component is obtained. For example, assuming that a RIM RS k is received, a signal from which the RIM RS k is removed is expected to have high channel power, but a signal from which a RIM RS q (≠k) is removed is expected to have relatively low channel power. Here, removing the RIM RS k means an operation of dividing the RIM RS k from a received signal on a frequency axis and corresponds to an operation of multiplying a conjugated RIM RS k in a correlation operation on a time axis. In a correlation operation, assuming that the RIM RS k is received, the result of a correlation operation with the RIM RS k will have a high value, but the result of a correlation operation with the RIM RS q(≠k) will have a relatively small value.

An IFFT operator 614a-1 performs an IFFT operation on the signal from which the RIM RS is removed. The signal from which the RIM RS is removed is changed to a signal in the time domain through the IFFT operation. Here, to reduce channel power loss in the time domain and to facilitate implementation, an IFFT size having a size (e.g., a power of 2 that is double or fourfold) larger than the number of REs of the RIM RS may be adopted.

A square operator 616a-1 may calculate the square of the absolute value of the signal in the time domain. A signal denoting power is obtained as the square of the absolute value of the signal in the time domain by the square operator 616a-1.

As described above, the RIM RS-1 remover 612a-1, the IFFT operator 614a-1, and the square operator 616a-1 perform preprocessing operations for detecting a RIM RS 1 from a signal received through one antenna. Similar operations may be performed by a RIM RS-K remover 612a-K, an IFFT operator 614a-K, and a square operator 616a-K to detect a RIM RS K. In addition, for signals received through other antennas, similar operations are performed by a RIM RS-1 remover 612b-1, an IFFT operator 614b-1, and a square operator 616b-1, and by a RIM RS-K remover 612b-K, an IFFT operator 614b-K, and a square operator 616b-K. Subsequent operations are performed for each sequence index. For convenience of description, operations related to one sequence, for example, a sequence of index 1, are representatively described.

An adder 618-1 adds the results of performing the preprocessing operations for detecting the RIM RS 1 on a signal received through each antenna. That is, signals corresponding to each antenna are subjected to preprocessing related to the same candidate sequence and then added by the adder 618-1.

A peak detector 620-1 detects at least one peak value from an added signal. The peak value may be interpreted as channel power. For example, when the size of an IFFT is 1024, a sample having the largest value among 1024 samples of the added signal, that is, the sample having a peak value (hereinafter, 'peak sample') may be considered as channel power. Since the channel power spreads around the sample having the peak value, the peak detector 620-1 may configure a window of a certain size around the sample having the peak value and may estimate the channel power. In a multipath channel, to collect channel power for a plurality of paths, the peak detector 620-1 may detect a second peak value, a third peak value, and the like around the peak sample identified above within the window and may add the values to a channel power component. The position of the peak value is provided to a noise estimator 622-1, and the peak value is provided to a comparator 624-1.

The noise estimator 622-1 estimates noise power, based on the position of the peak value. Since the channel power spreads around the sample having the peak value, the noise estimator 622-1 may configure a window of a certain size around the sample having the peak value and may select noise samples having no channel power component. Specifically, the noise estimator 622-1 may estimate the noise power by averaging the values of samples located outside the window.

The comparator 624-1 compares the ratio of the channel power and the noise power with a threshold value (e.g., TPAPR). That is, the comparator 624-1 compares the ratio of the channel power related to the RIM RS 1 obtained from the peak detector 620-1 and the noise power from the noise estimator 622-1 with the threshold value. As a result of the comparison, when the ratio is greater than the threshold value, it may be determined that the RIM RS 1 is received.

Determination of whether the RIM RS 1 is received by the peak detector 620-1, the noise estimator 622-1, and the comparator 624-1 is a primary, temporary, or preliminary determination/detection and may be referred to as a 'PAPR test', an 'SNR test', a 'first test', or a 'primary test'. Subsequently, a determination unit 626 may determine whether a final detection is made. The peak detector 620-1, the noise estimator 622-1, and the comparator 624-1 perform determination operations on the RIM RS 1, and similar operations for a different RIM RS may be performed by a peak detector 620-k, a noise estimator 622-k, and a comparator 624-k.

The determination unit 626 determines whether at least one RIM RS determined through the PAPR test is finally detected. When one RIM RS is detected by the PAPR test, the determination unit 626 may finally determine that the detected one RIM RS is received. However, when a plurality of RIM RSs is detected by the PAPR test, the determination unit 626 performs an operation to exclude at least one RIM RS corresponding to an FA in view of the possibility of occurrence of an FA. According to various embodiments, the determination unit 626 may check a detection erroneously determined by distortion, that is, a detection corresponding to an FA, in view of a cross-correlation value between sequences. According to an embodiment, the determination unit 626 may determine threshold values respectively corresponding to a plurality of detected sequences, based on the cross-correlation value and may determine whether each of the plurality of sequences is finally received using the threshold values.

Figure 7A:
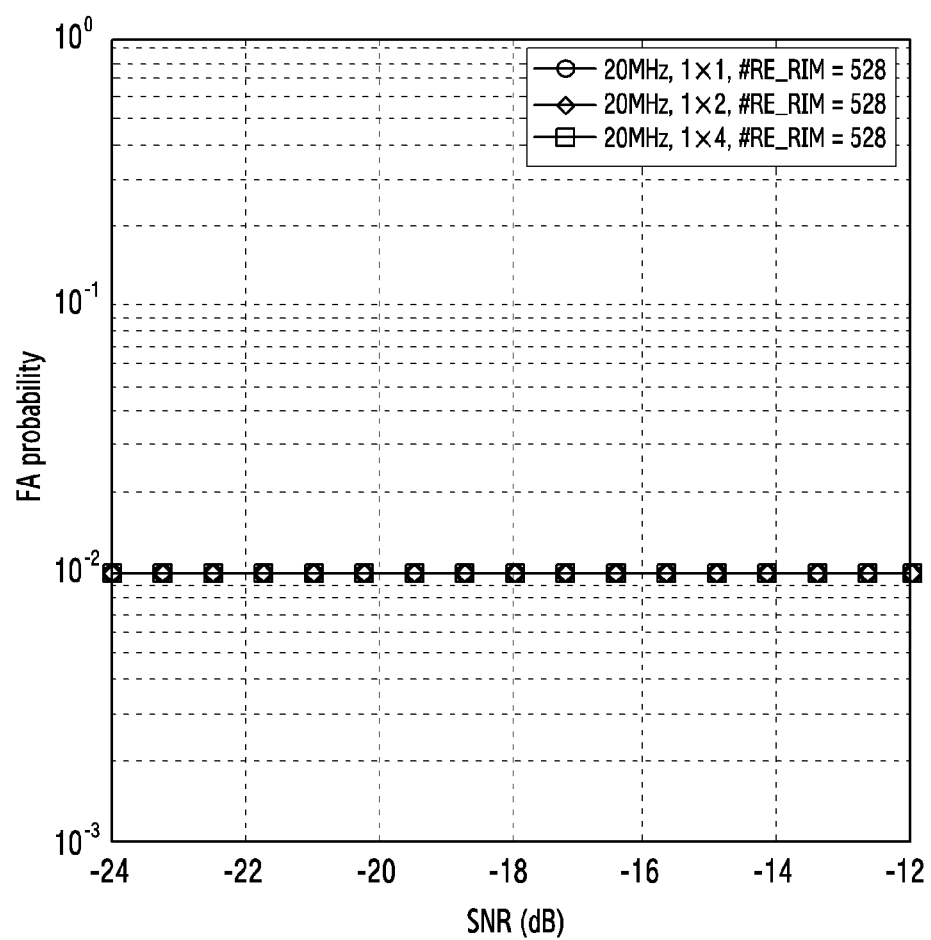
FIG. 7A illustrates a false alarm (FA) probability when a peak-to-average ratio (PAPR) test is performed in an environment using one candidate RIM RS.

FIG. 7A illustrates a false alarm (FA) probability when a PAPR test is performed in an environment using one candidate RIM RS. That is, FIG. 7A illustrates an FA probability when there is one candidate RIM RS and no RIM RS is actually received. Referring to FIG. 7A, when there is one candidate RIM RS, that is, when the number of available sequences is one, the FA probability is about 0.01. In defining a sequence or designing a detection algorithm, it is preferable to maximize a detection probability while maintaining an FA probability of a specific value (e.g., 0.01 in FIG. 7) or less.

Figure 7B:
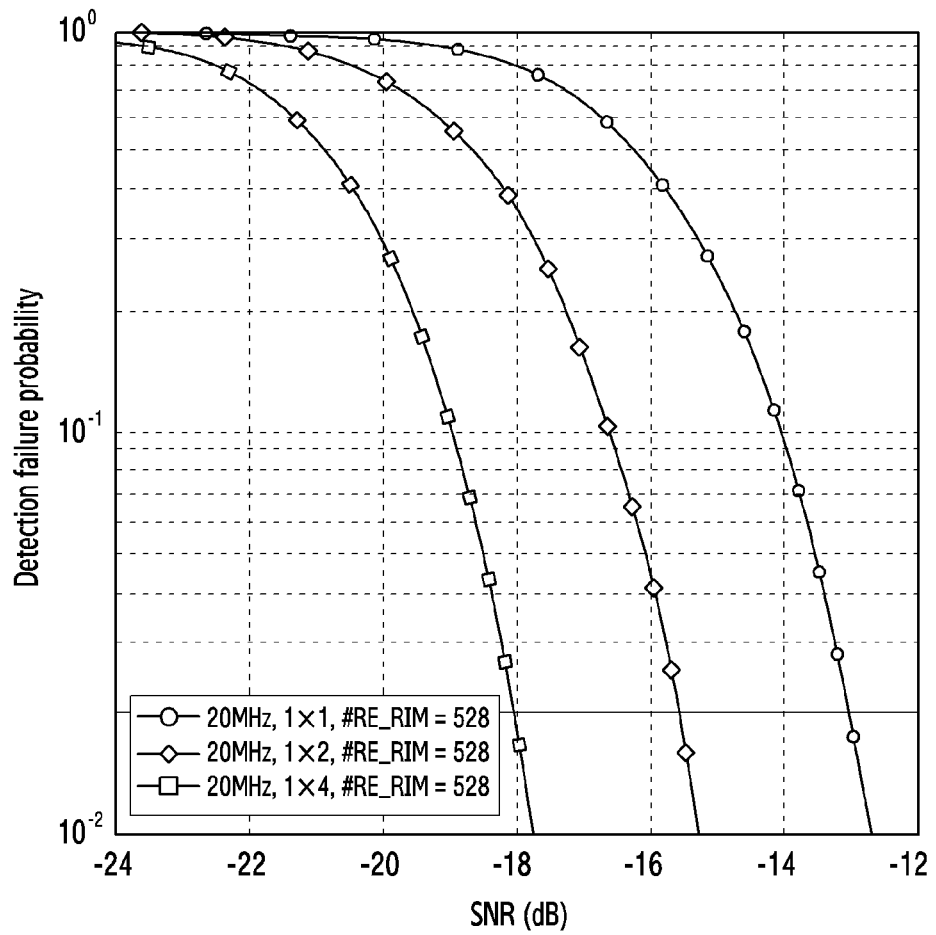
FIG. 7B illustrates a detection failure probability when a RIM RS is received in an environment using one candidate RIM RS.

FIG. 7B illustrates a detection failure probability when a RIM RS is received in an environment using one candidate RIM RS. That is, FIG. 7B illustrates a detection failure probability (=1−detection probability), that is, a missing probability, when a threshold value in a PAPR test for maintaining an FA probability of 0.01 or less is used in a case where there is one candidate RIM RS and one RIM RS is received. Referring to FIG. 7B, it is identified that as the number of reception antennas increases, the missing probability decreases due to a non-coherent integration gain at a given signal-to-noise ratio (SNR).

Unlike an FA probability and a detection probability, an error detection probability refers to a probability of determining that a RIM RS other than an actually received RIM RS is received when n (n>0) RIM RSs are received. For example, the error detection probability refers to a probability of determining that a RIM RS q k) is received even though a RIM RS k is actually received. Therefore, the error detection probability may be expressed as a function of the number n of actually received RIM RS. The error detection probability value may vary depending on the value of n.

Figure 8A:
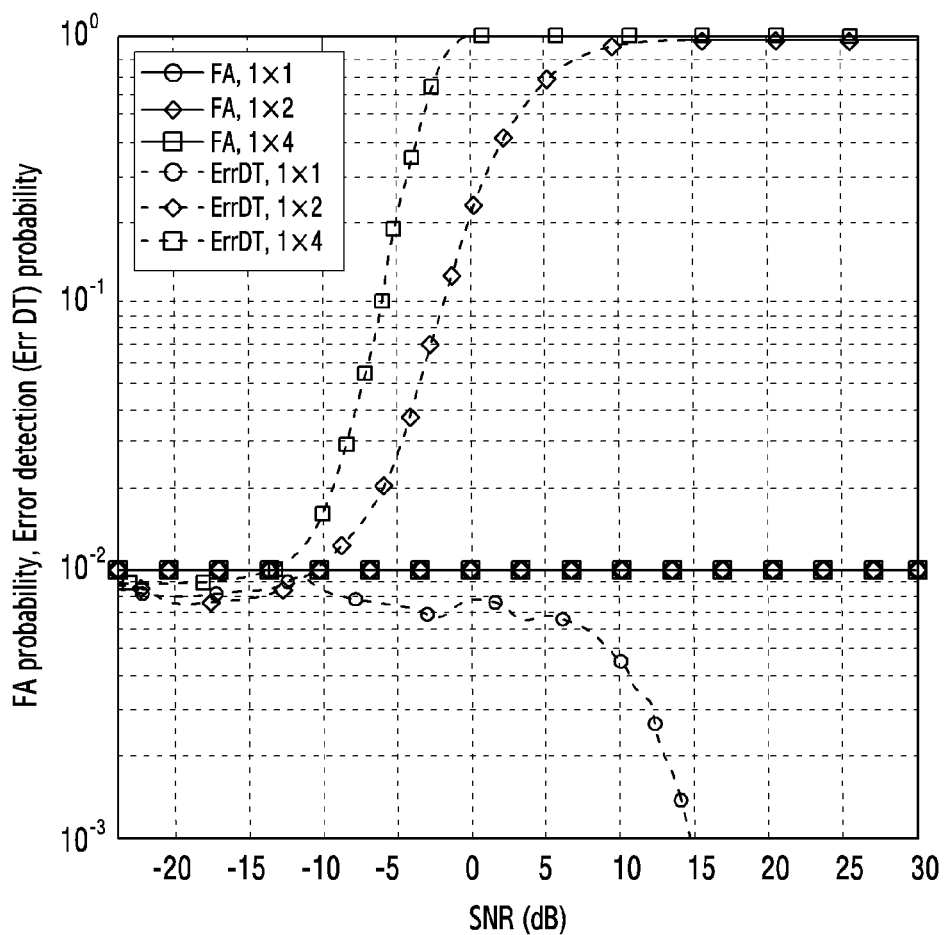
FIG. 8A illustrates an FA probability and an error detection probability according to a PAPR test when one RIM RS is received in an environment using eight candidate RIM RSs.

FIG. 8A illustrates an FA probability and an error detection probability according to a PAPR test when one RIM RS is received in an environment using eight candidate RIM RSs. Referring to FIG. 8A, it is identified that the FA probability is maintained at 0.01 or less, while the error detection probability increases to a value close to 1 as the number of reception antennas increases and the SNR increases.

Figure 8B:
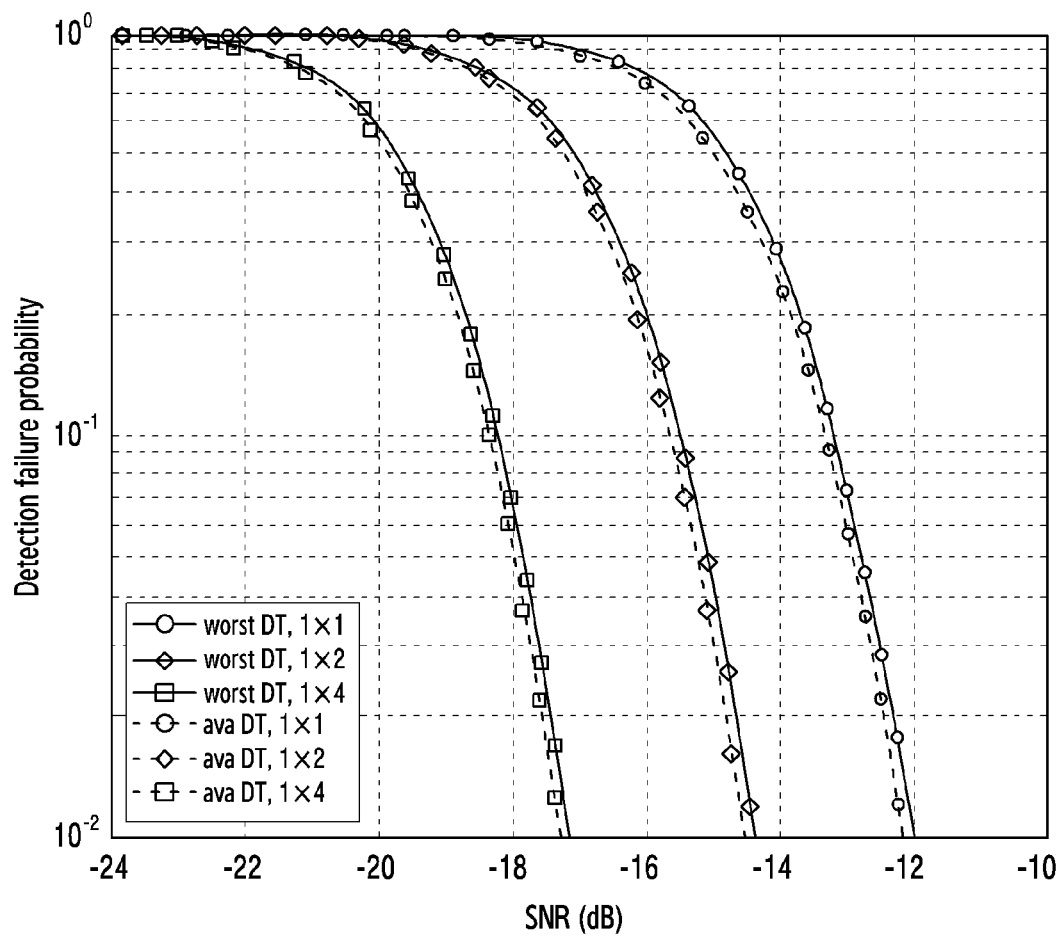
FIG. 8B illustrates a detection failure probability according to a PAPR test when one RIM RS is received in an environment using eight candidate RIM RSs.

FIG. 8B illustrates a detection failure probability according to a PAPR test when one RIM RS is received in an environment using eight candidate RIM RSs. Referring to FIG. 8B, although the worst detection probability and the average detection probability do not exhibit a significant difference, it is identified that the missing probability decreases due to a non-coherent integration gain at a given signal-to-noise ratio (SNR) as the number of reception antennas increases.

Figure 9A:
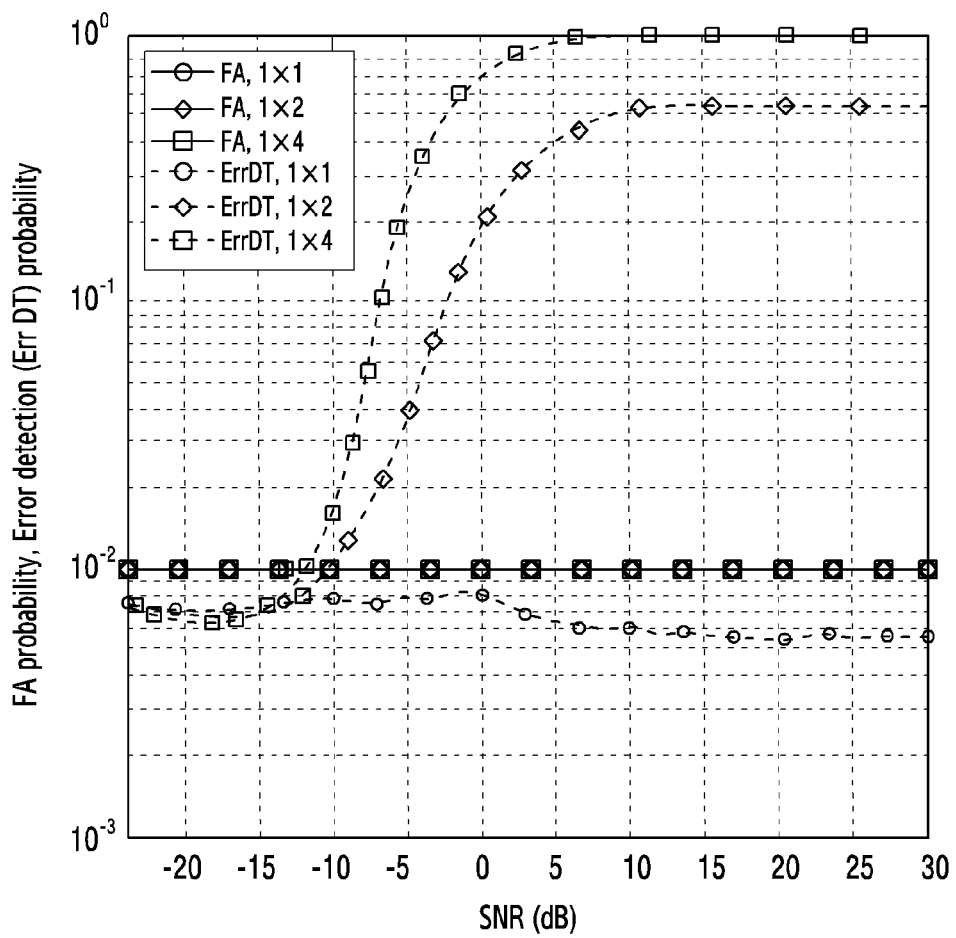
FIG. 9A illustrates an FA probability and an error detection probability according to a PAPR test when two RIM RSs are received in an environment using eight candidate RIM RSs.

FIG. 9A illustrates an FA probability and an error detection probability according to a PAPR test when two RIM RSs are received in an environment using eight candidate RIM RSs. Referring to FIG. 9A, it is identified that the FA probability is maintained at 0.01 or less, while the error detection probability increases to a value close to 1 as the number of reception antennas increases and the SNR increases.

Figure 9B:
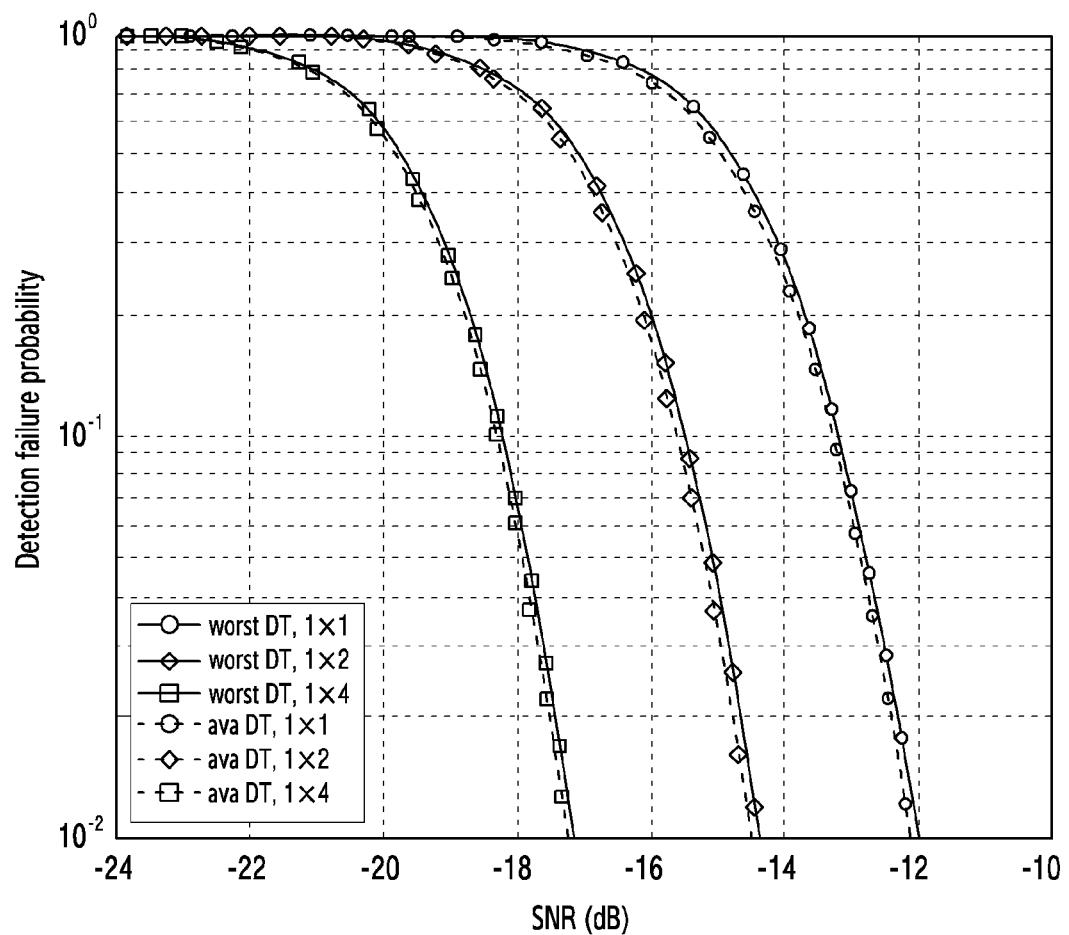
FIG. 9B illustrates a detection failure probability according to a PAPR test when two RIM RSs are received in an environment using eight candidate RIM RSs.

FIG. 9B illustrates a detection failure probability according to a PAPR test when one RIM RS is received in an environment using eight candidate RIM RSs. Referring to FIG. 9B, although the worst detection probability and the average detection probability do not exhibit a significant difference, it is identified that the missing probability decreases due to a non-coherent integration gain at a given signal-to-noise ratio (SNR) as the number of reception antennas increases.

As described with reference to FIGS. 8B and 9B, in an environment in which K candidate RIM RSs are used, even though a detector uses a threshold value of a PAPR test for maintaining an appropriate FA probability, an adequate error detection probability may not be secured only by a PAPR test technique. Accordingly, the disclosure illustrates various embodiments of verifying or pruning a RIM RS determined to be received through a PAPR test. Through a pruning operation, it is expected to reduce an error detection probability without lowering detection performance. A pruning operation may be referred to as a 'pruning test', a 'second test, or a 'secondary test. For a pruning test, cross-correlation values between sequences that can be included in a RIM RS may be used. For example, for a pruning test, cross-correlation values between RIM RSs including QPSK symbols based on a Gold sequence may be used. For example, high pruning performance may be obtained through comparison of the ratio of channel power for a RIM RS k with a threshold value.

Figure 10:
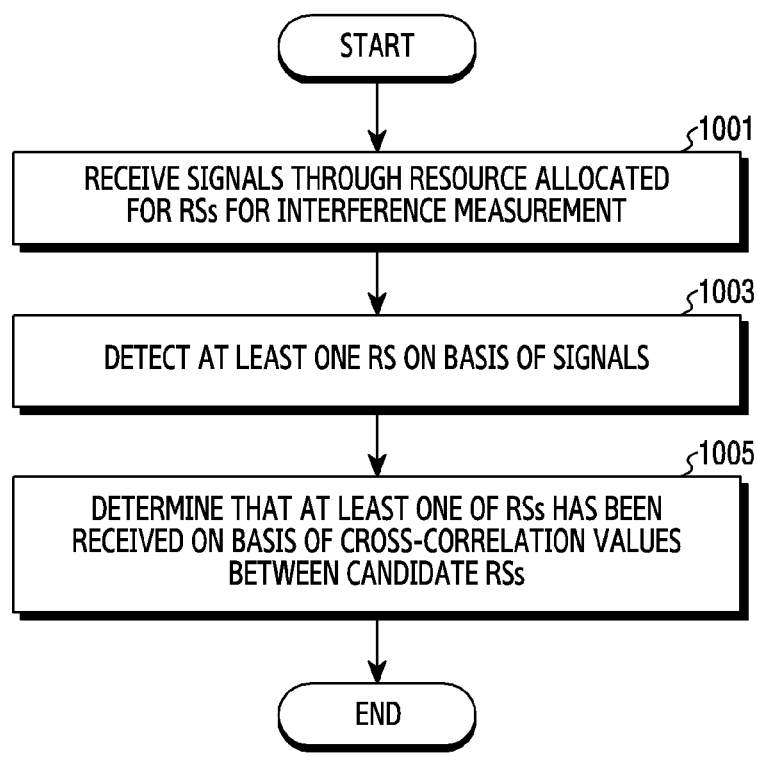
FIG. 10 is a flowchart illustrating RIM RS detection of a base station in a wireless communication system according to various embodiments of the disclosure.

FIG. 10 is a flowchart illustrating RIM RS detection of a base station in a wireless communication system according to various embodiments of the disclosure. FIG. 10 illustrates an operating method of the base station 120.

Referring to FIG. 10, in operation 1001, the base station receives a signal through a resource allocated for RSs for interference measurement. The RSs for interference measurement may include a RIM RS. The resource allocated for the RSs for interference measurement may be identified according to a predefined rule. For example, resources (e.g., REs or subcarriers) may be determined according to the bandwidth of an operating frequency of the base station. For example, when the bandwidth is 10 MHz, the resource allocated for the RSs may include at least one RE in middle 44 RBs. In another example, when the bandwidth is 20 MHz, the resource allocated for the RSs may include at least one RE within 44 RBs from the bottom of a lower 10 MHz band or at least one RE within 44 RBs from the top of an upper 20 MHz band.

In operation 1003, the base station detects at least one RS, based on signals. That is, the base station performs a PAPR test. To detect a sequence, the base station may extract signals from the resources allocated for the RSs and may detect at least one RS from the extracted signals. For example, the base station may determine determination indices corresponding to each candidate sequence, based on the extracted signals and each candidate sequence, and may detect at least one RS, based on the determined determination indices. Here, when the base station uses a plurality of reception antennas, signals for each antenna are preprocessed and then added for each candidate RS used for the preprocessing. According to an embodiment, the base station may remove a signal sequence corresponding to each candidate RS from the extracted signals, may convert the signals into a time-domain signal, may determine the level of the time-domain signal, may determine channel power and noise power from the level of the time-domain signal, and may identify a plurality of candidate RSs having a ratio between the channel power and the noise power exceeding a threshold value. That is, the base station performs a correlation operation using the signal sequence corresponding to each candidate RS from the extracted signals and converts the signals into the time-domain signal. Subsequently, the base station may sort the time-domain signals in order of level, and may determine a sample value having the largest value as the channel power or may determine the sum of sample values neighboring a sample having the maximum value as the channel power. In addition, the base station may configure a window of a certain size around the sample having the maximum value and may determine the average of sample values positioned outside the window as the noise power. According to another embodiment, the base station may calculate correlation values between the extracted signals and each candidate RS and may identify a plurality of candidate RSs corresponding to correlation values exceeding a threshold value.

In operation 1005, the base station determines that at least one of the at least one RS is received, based on the cross-correlation values between the candidate RSs. That is, the base station performs a pruning test. A determination index corresponding to an RS that has not been received may be distorted due to a cross-correlation value between candidate RSs. Accordingly, the base station may check a detection erroneously determined by distortion, that is, a detection corresponding to an FA, in view of a cross-correlation value between RSs. According to an embodiment, the base station may determine threshold values respectively corresponding to a plurality of detected RSs, based on the cross-correlation value, and may determine whether each of the plurality of RSs is finally received using the threshold values. For example, a threshold value may be determined based on the ratio between channel power of an RS having the largest channel power among the plurality of detected RSs and the channel power of each RS. According to another embodiment, the base station correct (e.g., reduce) a determination index of each of the plurality of RSs using the cross-correlation values and may redetermine whether the RSs are detected, based on the corrected determination index, thereby determining whether each of the plurality of RSs is finally received. For example, the base station may remove a contribution by the cross-correlation value from a channel power value determined in operation 1003 and may then compare the ratio between the channel power and the noise power with the threshold value again, thereby redetermining whether a corresponding RS is detected. When only one RS is detected in operation 1003, operation 1005 may be omitted.

As in the embodiment described with reference to FIG. 10, the base station may perform a primary test based on channel power and noise power and a secondary test based on cross-correlation values, thereby finally determining whether an RS is received. That is, the base station may finally determine whether the RS is received, based on a cross-correlation value between sequences. Accordingly, the base station may obtain information about an aggressor that causes interference. For example, the obtained information may include at least one of identification information about the aggressor, a resource affected by the interference, a propagation delay of an interference signal, and the strength of the interference.

According to various embodiments, a cross-correlation peak value between candidate RIM RSs may be predefined for a pruning test. Since available candidate sequences for the candidate RIM RSs are predefined, a peak value between RIM RSs including different sequences may also be predefined. Subsequently, when detecting a RIM RS, if it is determined that two or more RIM RSs are received by a PAPR test, a detector may determine whether at least one RIM RS is wrongly detected through the pruning test. The detector determines whether a RIM RS that has passed the PAPR test is finally detected, based on comparison of the ratio of channel power of the plurality of detected RIM RSs with a threshold value. This pruning test may be repeated for each RIM RS that has passed the PAPR test.

For the pruning test, K RIM RSs and a cross-correlation peak value between the K RIM RSs may be calculated and stored in advance as follows. For example, the cross-correlation peak value may be calculated by Equations 1 to 4. Assuming a frequency flat channel, a signal obtained by removing a RIM RS k' from a received signal may be represented by Equation 1.

$$v_{k,k'}(m) = \sigma_k(m)\sigma^*_{k'}(m) \quad \text{Equation 1}$$

In Equation 1, m denotes an RE index, $v_{k,k'}(m)$ denotes the value of a RIM RS k'-removed signal corresponding to an RE of index m, $\sigma_k(m)$ denotes the value of a signal mapped to the RE of index m, and $\sigma_{k'}(m)$ denotes a value mapped to the RE of index m among values included in the RIM RS k'. Here, the index m of an RE is sequentially assigned from the lowest frequency, for example, the index m of an RE having the lowest frequency is 0, and the index m of a 528(=44×12)th RE is 527. A time-domain signal may be obtained through an IFFT operation having a size larger than the length of a RIMS RS. The time-domain signal may be represented by Equation 2.

$$y_{k,k'}(n) = \frac{1}{\sqrt{N_{IFFT}}} \sum_{m=0}^{N_{RS}-1} v_{k,k'}(m) e^{j2\pi mn/N_{IFFT}}, \quad \text{Equation 2}$$

$$0 \le n < N_{IFFT}$$

In Equation 2, $y_{k,k'}(n)$ denotes an nth sample of a time-domain signal, $N_{IFFT}$ denotes the size of an IFFT operation, NRS denotes the length of a RIM RS, m denotes an RE index, and $v_{k,k'}(m)$ denotes the value of a RIM RS k'-removed signal corresponding to an RE of index m.

When a direct current (DC) tone is a null carrier and a RIM RS of a sender includes a DC tone, a time-domain signal may be represented by Equation 3.

$$y_{k,k'}(n) = \frac{1}{\sqrt{N_{IFFT}}} \sum_{m=0}^{N_{RS}} v'_{k,k'}(m) e^{2\pi mnf/N_{IFFT}}, \quad \text{Equation 3}$$

$$0 \le n < N_{IFFT}$$

$$v'_{k,k'}(m) = \begin{cases} v_{k,k'}(m), & 0 \le m < N'_{RS} - 1 \\ 0, & m = N'_{RS} \\ v_{k,k'}(m), & N'_{RS} + 1 \le m \le N_{RS} \end{cases}$$

In Equation 3, $y_{k,k'}(n)$ denotes an nth sample of a time-domain signal, $N_{IFFT}$ denotes the size of an IFFT operation, NRS denotes the length of a RIM RS, m denotes an RE index, $v_{k,k'}(m)$ denotes the value of a RIM RS k-removed signal corresponding to an RE of index m, and NRS denotes the number of REs of the RIM RS having a smaller index than a DC tone.

A cross-correlation peak value may be determined from the time-domain signal. The cross-correlation peak value may be represented by Equation 4.

$$\rho(k, k') = \max_n |y_{k,k'}(n)|^2 \quad \text{Equation 4}$$

In Equation 4, $\rho(k,k')$ denotes a cross-correlation peak value, and $y_{k,k'}(n)$ denotes an nth sample of a time-domain signal. $\rho(k,k')$ is the same as $\rho(k',k)$.

Cross-correlation peak values for pairs of combinable candidate RIM RSs may be determined by the operations described with reference to Equations 1 to 4. The determined cross-correlation peak values may be stored in a base station and may be used for subsequent RIM RS detection. The cross-correlation peak values may be used for determining a threshold value for the pruning test. For example, the threshold value may be determined by Equation 5.

$$T_{\_PRUNE}(k, k^*) = G_{\_PRUNE} \frac{\rho(k, k^*)}{\rho(k^*, k^*)} \quad \text{Equation 5}$$

In Equation 5, k* denotes the index of a RIM RS having the maximum channel power among RIM RSs that have passed the PAPR test, $T_{\_PRUNE}(k,k^*)$ denotes a threshold value for the pruning test on a RIM RS k, $G_{\_PRUNE}$ denotes a gain value for the pruning test, and $\rho(k,k^*)$ denotes a cross-correlation peak value between a RIM RS k and a RIM RS k*. Here, the gain value $G_{\_PRUNE}$ is a constant determining the error detection probability of the pruning test and may be determined according to a desired error detection probability.

Figure 11:
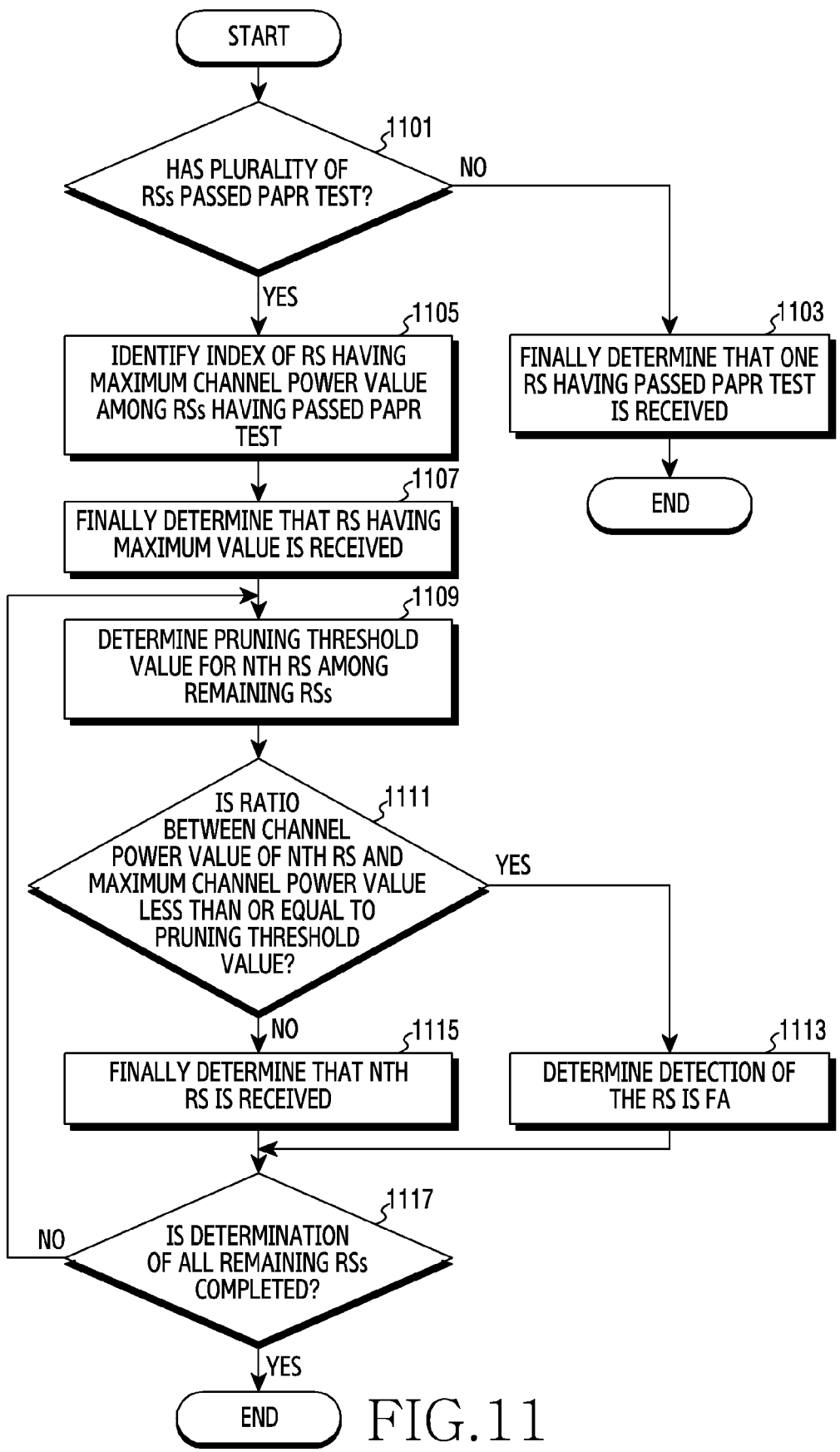
FIG. 11 is a flowchart illustrating a pruning test of a base station in a wireless communication system according to various embodiments of the disclosure.

The pruning test using the threshold value according to Equation 5 may be performed as in FIG. 11.

FIG. 11 is a flowchart illustrating a pruning test of a base station in a wireless communication system according to various embodiments of the disclosure. FIG. 11 illustrates an operating method of the base station 120.

Referring to FIG. 11, in operation 1101, the base station identifies whether a plurality of RSs have passed a PAPR test. The PAPR test refers to a test based on the ratio between channel power and noise power estimated assuming that a candidate RS is received. The PAPR test may be performed on all candidate RSs.

When the plurality of RSs has not passed the PAPR test, that is, when only one RS has passed the PAPR test, the base station finally determines that one RS that has passed the PAPR test is received in operation 1103. That is, since the plurality of RSs is not detected, a pruning test may be omitted.

When the plurality of RSs has passed the PAPR test, the base station identifies the index of an RS having the maximum channel power value among the RSs that have passed the PAPR test in operation 1105. Since the channel power values of the respective candidate RSs are calculated by the PAPR test, the base station retrieves the maximum value among the channel power values of the RSs that have passed the PAPR test and identifies the index of a sequence included in the RS corresponding to the maximum value.

In operation 1107, the base station finally determines that the RS having the maximum value is received. That is, the base station determines that detection of the RS having the maximum channel power value among the RSs that have passed the PAPR test is not an FA. This is because even though there is distortion of channel power due to a cross-correlation between RSs, it is expected that the distortion does not cause the channel power of an RS that is not received to be greater than the channel power of a received RS.

In operation 1109, the base station determines a pruning threshold value for an nth RS among the remaining RSs. The pruning threshold value may be determined based on a cross-correlation value between the nth RS and the RS having the maximum channel power. Here, the cross-correlation value may be one of a peak value, an average value, and a minimum value of the cross-correlation, or a combination thereof. The pruning threshold value may correspond to a value indicating the degree of distortion occurring when estimating the channel power of the nth RS by the reception of the RS having the maximum channel power. For example, the pruning threshold value may be determined as a value obtained by multiplying the ratio between the 'cross-correlation value between the nth RS and the RS having the maximum channel power' and the 'auto-correlation value of the RS having the maximum channel power' by a constant weight. Specifically, the pruning threshold value may be determined by Equation 5.

In operation 1111, the base station identifies whether the ratio between the channel power value of the nth RS and the maximum channel power value is less than or equal to the pruning threshold value. The ratio between the channel power values is compared because the pruning threshold value is defined as the ratio between correlation values. Accordingly, when the form of the pruning threshold value is changed, a value to be compared may also be changed.

When the ratio between the channel power value of the nth RS and the maximum channel power value is less than or equal to the pruning threshold value, the base station determines that detection of the nth RS is an FA in operation 1113. That is, it is determined that the nth RS passing the PARP test is an FA. Accordingly, the nth RS is excluded from a final detection determination.

When the ratio between the channel power value of the nth RS and the maximum channel power value is not less than or equal to the pruning threshold value, the base station finally determines that the nth RS is received in operation 1115. That is, the base station determines that estimated channel power for the nth RS is sufficiently large even though the distortion due to the cross-correlation is considered.

In operation 1117, the base station identifies whether determination of all remaining RSs is completed. That is, the base station identifies whether there is an RS that has not undergone the pruning test. When the determination of all remaining RSs is not completed, the base station increases n by 1 and then returns to operation 1109.

In the embodiment described with reference to FIG. 11, the determination in operation 1111 may be represented by Equation 6.

$$\frac{P(k)}{P(k^*)} < G_{\_PRUNE} \frac{\rho(k, k^*)}{\rho(k^*, k^*)} \qquad \text{Equation 6}$$

In Equation 6, k* denotes the index of an RIM RS having the maximum channel power among RIM RSs having passed the PAPR test, P(k) denotes a channel power value corresponding to a RIM RS k, G PRUNE denotes a gain value for the pruning test, and ρ(k,k*) denotes a cross-correlation peak value between a RIM RS k and a RIM RS k*.

When the values used in the determination of operation 1111 are expressed in a dB domain, Equation 6 may be expressed as Equation 7.

$$\log_{10}[P(k)/N(k)]-\log_{10}[P(k^*)/N(k^*)] < G_{\_PRUNE\_Db} + \\ \log_{10}[\rho(k,k^*)]-\log_{10}[\rho(k^*,k^*)] \qquad \text{Equation 7}$$

In Equation 7, k* denotes the index of an RIM RS having the maximum channel power among RIM RSs having passed the PAPR test, P(k) denotes a channel power value corresponding to a RIM RS k, $G_{\_PRUNE\_DB}$ denotes a gain value in dB scale for the pruning test, and ρ(k,k*) denotes a cross-correlation peak value between a RIM RS k and a RIM RS k*.

In the embodiment described with reference to FIG. 11, the determination in operation 1111 is performed based on channel power. According to another embodiment, noise power may be further used. For example, the ratio between channel power and noise power may be used instead of channel power. In this case, the determination in operation 1111 may be represented by Equation 8.

$$\frac{P(k)/N(k)}{P(k^*)/N(k^*)} < G_{\_PRUNE} \frac{\rho(k, k^*)}{\rho(k^*, k^*)} \qquad \text{Equation 8}$$

In Equation 8, k* denotes the index of an RIM RS having the maximum SNR among RIM RSs having passed the PAPR test, P(k) denotes a channel power value corresponding to a RIM RS k, N(k) denotes a noise power value corresponding to the RIM RS k, $G_{\_PRUNE\_DB}$ denotes a gain value for the pruning test, and ρ(k,k*) denotes a cross-correlation peak value between a RIM RS k and a RIM RS k*.

When the values used in the determination of operation 1111 are expressed in a dB domain, Equation 8 may be expressed as Equation 9.

$$\log_{10}[P(k)/N(k)]-\log_{10}[P(k^*)/N(k^*)] < G_{\_PRUNE\_DB} + \\ \log_{10}[\rho(k,k^*)]-\log_{10}[\rho(k^*,k^*)] \qquad \text{Equation 9}$$

In Equation 9, k* denotes the index of an RIM RS having the maximum SNR among RIM RSs having passed the PAPR test, P(k) denotes a channel power value corresponding to a RIM RS k, N(k) denotes a noise power value corresponding to the RIM RS k, $G_{RUNE\_DB}$ denotes a gain value in dB scale for the pruning test, and ρ(k,k*) denotes a cross-correlation peak value between a RIM RS k and a RIM RS k*.

In the determination operation represented by Equations 6 to 9, the pruning threshold value is expressed as a value obtained by multiplying the ratio between the 'cross-correlation value between the nth RS and the RS having the maximum channel power' and the 'auto-correlation value of the RS having the maximum channel power' by a constant weight. However, according to various embodiments, the threshold value may be variously defined, and it is obvious that the disclosure is not limited to the threshold value expressed in Equations 6 to 9.

Figure 12A:
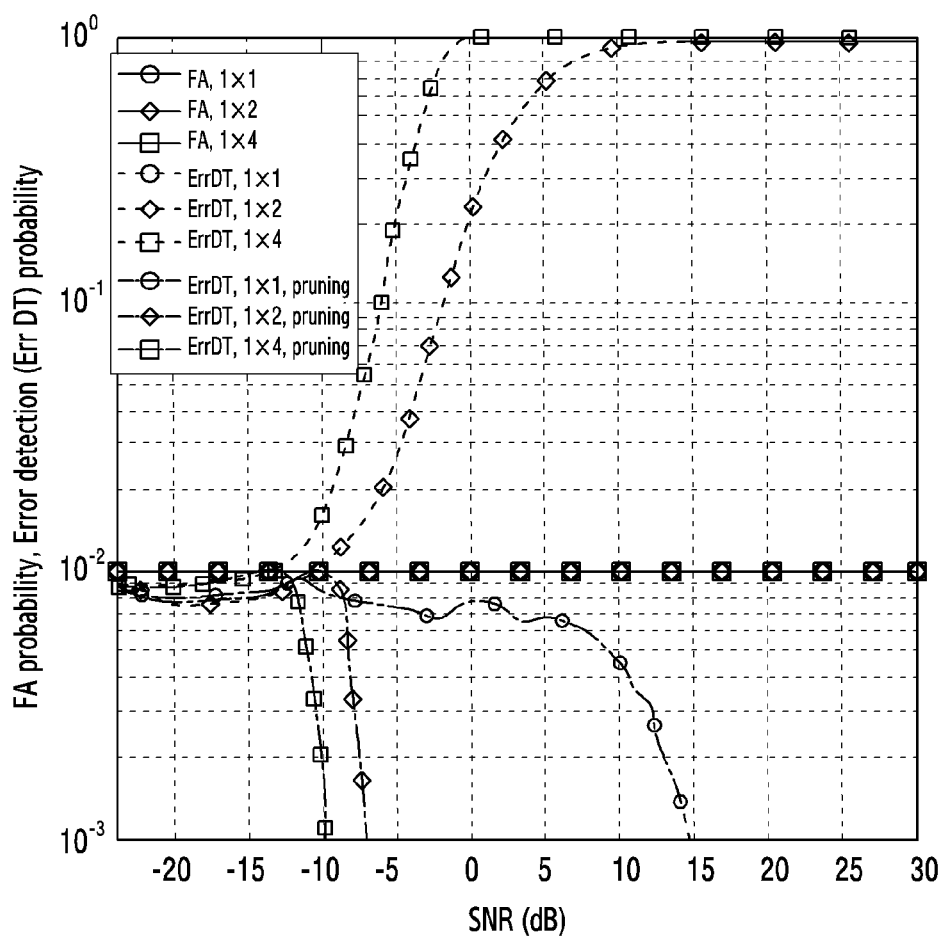
FIG. 12A illustrates an FA probability and an error detection probability according to a pruning test when one RIM RS is received in an environment using eight candidate RIM RSs.

FIG. 12A illustrates an FA probability and an error detection probability according to a pruning test when one RIM RS is received in an environment using eight candidate RIM RSs. Referring to FIG. 12A, it is identified that the FA probability is maintained at 0.01 or less, and the error detection probability is maintained at 0.01 or less by the pruning test even though the number of reception antennas or an SNR increases.

Figure 12B:
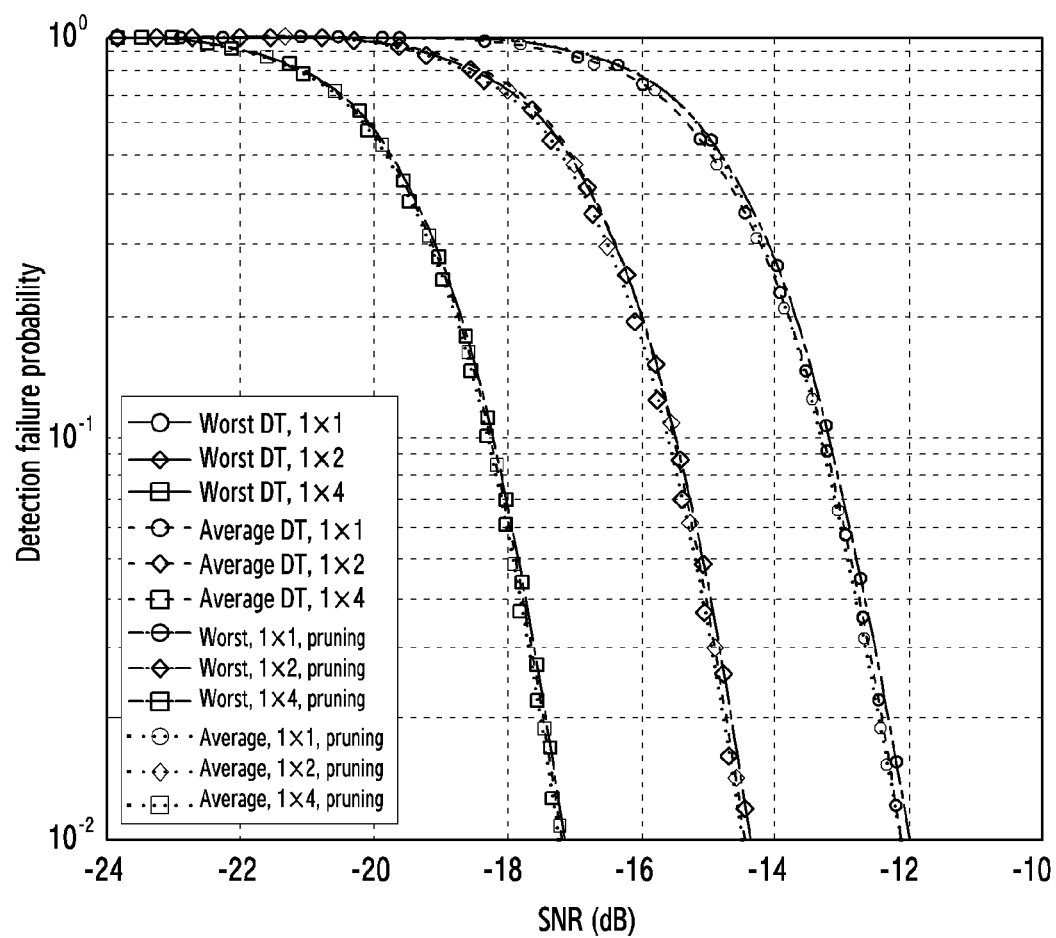
FIG. 12B illustrates a detection failure probability according to a pruning test when one RIM RS is received in an environment using eight candidate RIM RSs.

FIG. 12B illustrates a detection failure probability according to a pruning test when one RIM RS is received in an environment using eight candidate RIM RSs. Referring to FIG. 12B, it is identified that the error detection probability is reduced by the pruning test while there is no performance deterioration with respect to the worst detection probability and the average detection probability.

Figure 13A:
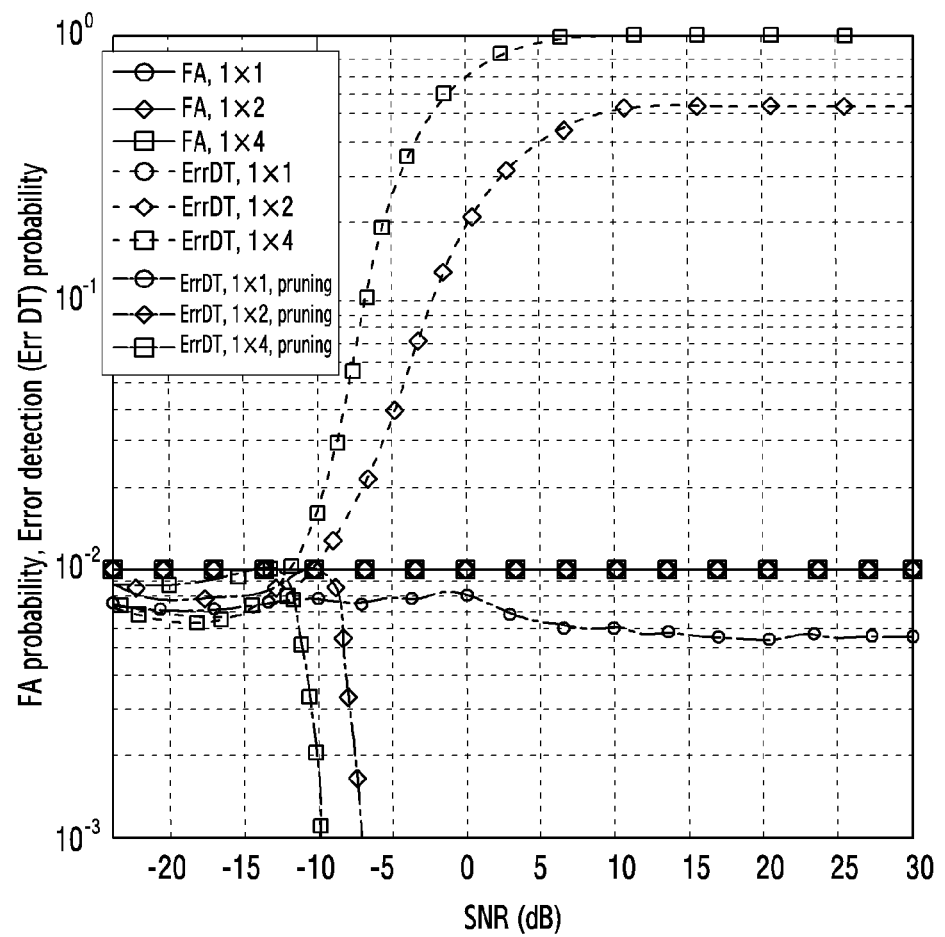
FIG. 13A illustrates an FA probability and an error detection probability according to a pruning test when two RIM RSs are received in an environment using eight candidate RIM RSs.

FIG. 13A illustrates an FA probability and an error detection probability according to a pruning test when two RIM RSs are received in an environment using eight candidate RIM RSs. Referring to FIG. 13A, it is identified that the FA probability is maintained at 0.01 or less, and the error detection probability is maintained at 0.01 or less by the pruning test even though the number of reception antennas or an SNR increases.

Figure 13B:
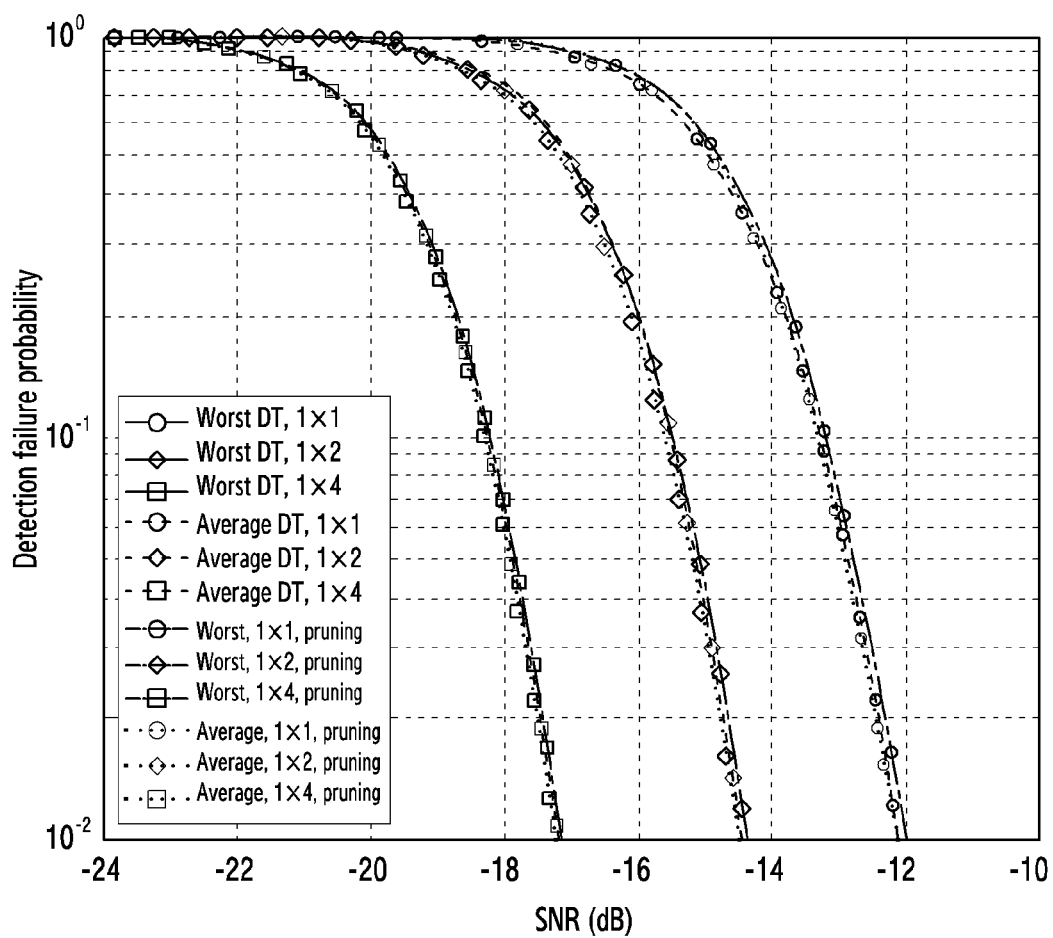
FIG. 13B illustrates a detection failure probability according to a pruning test when two RIM RSs are received in an environment using eight candidate RIM RSs.

FIG. 13B illustrates a detection failure probability according to a pruning test when two RIM RSs are received in an environment using eight candidate RIM RSs. Referring to FIG. 13B, it is identified that the error detection probability is reduced by the pruning test while there is no performance deterioration with respect to the worst detection probability and the average detection probability.

As described above, when at least one RIM RS is received, the pruning test may reduce an error of misdetermining that a RIM RS not received is received. Accordingly, a detector using a plurality of reception antennas can exhibit a very high RIM RS detection performance.

Figure 14:
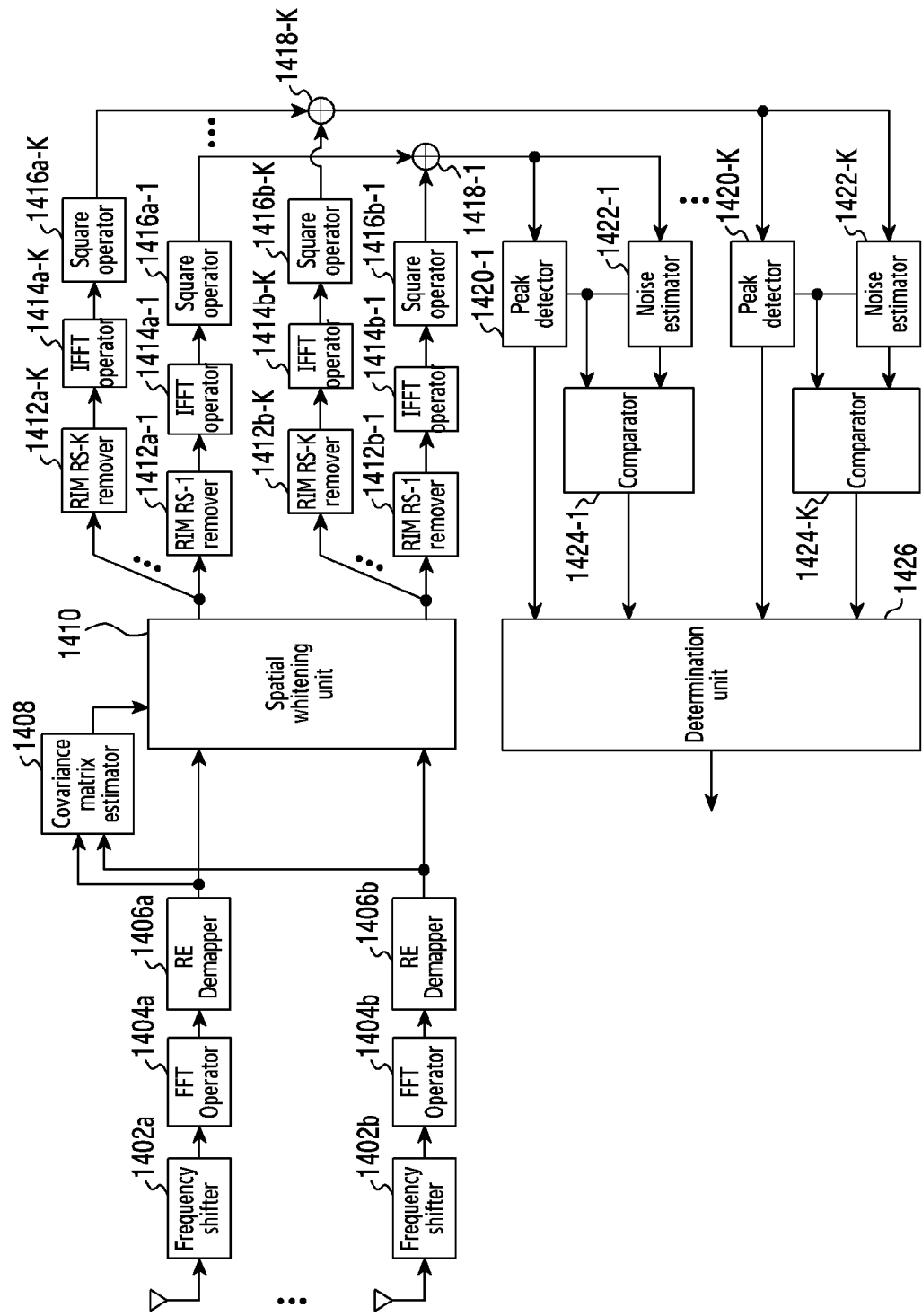
FIG. 14 illustrates a functional configuration of a base station for detecting a RIM RS in a wireless communication system according to various embodiments of the disclosure.

FIG. 14 illustrates a functional configuration of a base station for detecting a RIM RS in a wireless communication system according to various embodiments of the disclosure. Components illustrated in FIG. 14 may be understood as part of the wireless communication unit 210 and the controller 240 illustrated in FIG. 2.

Comparing with FIG. 6, FIG. 14 illustrates the configuration of the base station in which the power calculators 608a and 608b and the scalers 610a and 610b are replaced with a covariance matrix estimator 1408 and a spatial whitening unit 1410.

A frequency shifter 1402a, an FFT operator 1404a, and an RE demapper 1406a of FIG. 14 may correspond to the frequency shifter 602a, the FFT operator 604a, and the RE demapper 606a of FIG. 6, respectively.

A frequency shifter 1402b, an FFT operator 1404b, and an RE demapper 1406b of FIG. 14 may correspond to the frequency shifter 602b, the FFT operator 604b, and the RE demapper 606b of FIG. 6, respectively.

The covariance matrix estimator 1408 of FIG. 14 may estimate a covariance matrix $C_r$ for a RIM RS. In an embodiment, the covariance matrix $C_r$ may also be referred to as a spatial covariance matrix.

In an embodiment, the covariance matrix estimator 1408 may calculate a covariance matrix $C_r$ for signals extracted from $N_{RX}*K$ REs for the RIM RS. Here, $N_{RX}$ may denote the number of antennas. $N_{RX}$ may denote the number of reception antennas. K may denote the number of subcarriers.

In an embodiment, the covariance matrix estimator 1408 may calculate the covariance matrix $C_r$ having a size of $N_{RX}*N_{RX}$. In an embodiment, each element of the covariance matrix $C_r$ having a size of $N_{RX}*N_{RX}$ may denote a covariance value between a signal of an antenna corresponding to a row number of the element and a signal of an antenna corresponding to a column number thereof. In an embodiment, the values of the signals of the antennas may be identified based on the values of the signals extracted from the K REs. In an embodiment, the values of the signals of the antennas may include the average value, a weighted average value, or the sum of the signals extracted from the K REs, or a combination thereof.

The spatial whitening unit 1410 of FIG. 14 may perform spatial whitening on the RIM RS. In an embodiment, the spatial whitening unit 1410 may perform spatial whitening on the RIM RS based on the covariance matrix $C_r$ of the covariance matrix estimator 1408.

In an embodiment, the spatial whitening unit 1410 may perform spatial whitening on signals extracted from $N_{RX}$ REs for each of K subcarriers. In an embodiment, the spatial whitening unit 1410 may perform spatial whitening on signals $r_k$ extracted from $N_{RX}$ REs for an arbitrary kth subcarrier. In an embodiment, k may have an integer value between $k_0$ and $k_0+K-1$. In an embodiment, $k_0$ may denote a first subcarrier among the K subcarriers. In an embodiment, $k_0+K-1$ may denote a last (i.e., Kth) subcarrier among the K subcarriers.

In an embodiment, the spatial whitening unit 1410 may perform spatial whitening on the signals $r_k$ for the arbitrary kth subcarrier, based on the covariance matrix $C_r$. In an embodiment, the spatial whitening unit 1410 performs spatial whitening by multiplying the signals $r_k$ of the arbitrary kth subcarrier by the square root inverse matrix of the covariance matrix $C_r$.

According to an embodiment, the spatial whitening unit 1410 may obtain a whitened signal $\tilde{r}_k$ by performing spatial whitening on the signals $r_k$ of the arbitrary kth subcarrier.

In an embodiment, the spatial whitening unit 1410 may obtain the whitened signal $\tilde{r}_k$, based on Equation 10.

$$\tilde{r}_k = C_r^{-1/2} r_k \quad \text{Equation 10}$$

In Equation 10, $\tilde{r}_k$ may denote a whitened signal for a kth subcarrier. In an embodiment, $\tilde{r}_k$ may be a vector having $N_{RX}$ dimensions. In Equation 10, $r_k$ may denote reception signals on the kth subcarrier. In an embodiment, $r_k$ may be a vector having $N_{RX}$ dimensions. In Equation 10, $C_r^{-1/2}$ may denote the square root inverse matrix of a covariance matrix $C_r$. In an embodiment, $C_r^{-1/2}$ may have a size of $N_{RX}*N_{RX}$. In an embodiment, an operation with the square root inverse matrix of the covariance matrix $C_r$ may be performed by the covariance matrix estimator 1408 or the spatial whitening unit 1410.

In an embodiment, the spatial whitening unit 1410 may output K whitened signals to a corresponding RIM RS-1 remover 1412a-1, RIM RS-K remover 1412a-K, RIM RS-1 remover 1412b-1, and RIM RS-1 remover 1412b-K.

The RIM RS-1 remover 1412a-1 and the RIM RS-K remover 1412a-K of FIG. 14 may correspond to the RIM RS-1 remover 612a-1 and the RIM RS-K remover 612a-K of FIG. 6, respectively. The RIM RS-1 remover 1412b-1 and the RIM RS-K remover 1412b-K of FIG. 14 may correspond to the RIM RS-1 remover 612b-1 and the RIM RS-K remover 612b-K of FIG. 6, respectively. IFFT operators 1414a-1, 1414a-K, 1414b-1, and 1414b-K of FIG. 14 may correspond to the IFFT operators 614a-1, 614a-K, 614b-1, and 614b-K of FIG. 6, respectively. Square operators 1416a-1, 1416a-K, 1416b-1, and 1416b-K of FIG. 14 may correspond to the square operators 616a-1, 616a-K, 616b-1, and 616b-K of FIG. 6, respectively. Adders 1418-1 and 1418-K of FIG. 14 may correspond to the adders 618-1 and 618-K of FIG. 6, respectively. Peak detectors 1420-1 and 1420-K of FIG. 14 may correspond to the peak detectors 620-1 and 620-K of FIG. 6, respectively. Noise estimators 1422-1 and 1422-K of FIG. 14 may correspond to the noise estimators 622-1 and 622-K of FIG. 6, respectively. Comparators 1424-1 and 1424-K of FIG. 14 may correspond to the comparators 624-1 and 624-K of FIG. 6, respectively. A determination unit 1426 of FIG. 14 may correspond to the determination unit 626 of FIG. 6.

Figure 15:
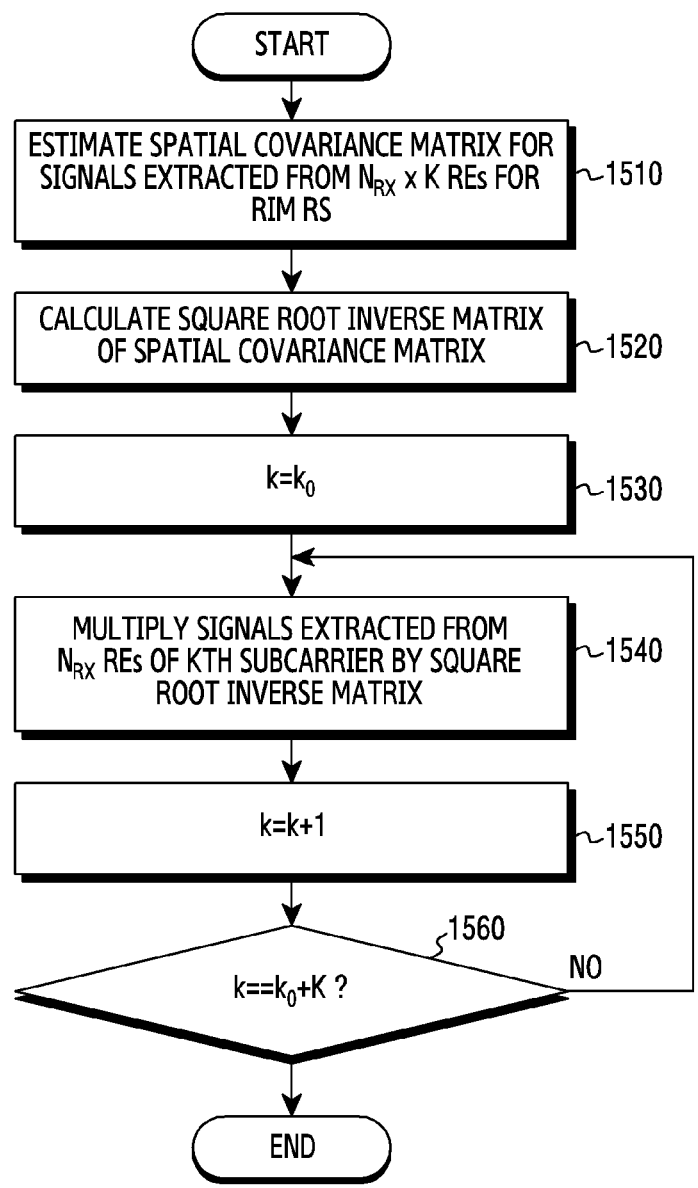
FIG. 15 is a flowchart illustrating spatial whitening performed by a base station in a wireless communication system according to various embodiments of the disclosure.

FIG. 15 is a flowchart illustrating spatial whitening performed by a base station in a wireless communication system according to various embodiments of the disclosure.

Referring to FIG. 15, in operation 1510, the base station may estimate a covariance matrix $C_r$ for signals extracted from $N_{RX}*K$ REs for a RIM RS.

In operation 1520, the base station may calculate the square root inverse matrix $C_r^{-1/2}$ of the covariance matrix $C_r$.

In operation 1530, the base station may configure a subcarrier index k to $k_0$.

In operation 1540, the base station may multiply signals $r_k$ extracted from $N_{RX}$ REs of a kth subcarrier by the square root inverse matrix $C_r^{-1/2}$. In operation 1540, the base station may obtain a whitened signal $\tilde{r}_k$ of the kth subcarrier by the multiplication.

In operation 1550, the base station may increase the subcarrier index k by 1.

In operation 1560, the base station may determine whether the subcarrier index k is equal to $k_0+K$.

When it is determined that the subcarrier index k is equal to $k_0+K$ ('yes') in operation 1560, the operation according to FIG. 15 may be terminated. When it is determined that the subcarrier index k is not equal to $k_0+K$ ('no') in operation 1560, operation 1540 may be performed again.

Figure 16A:
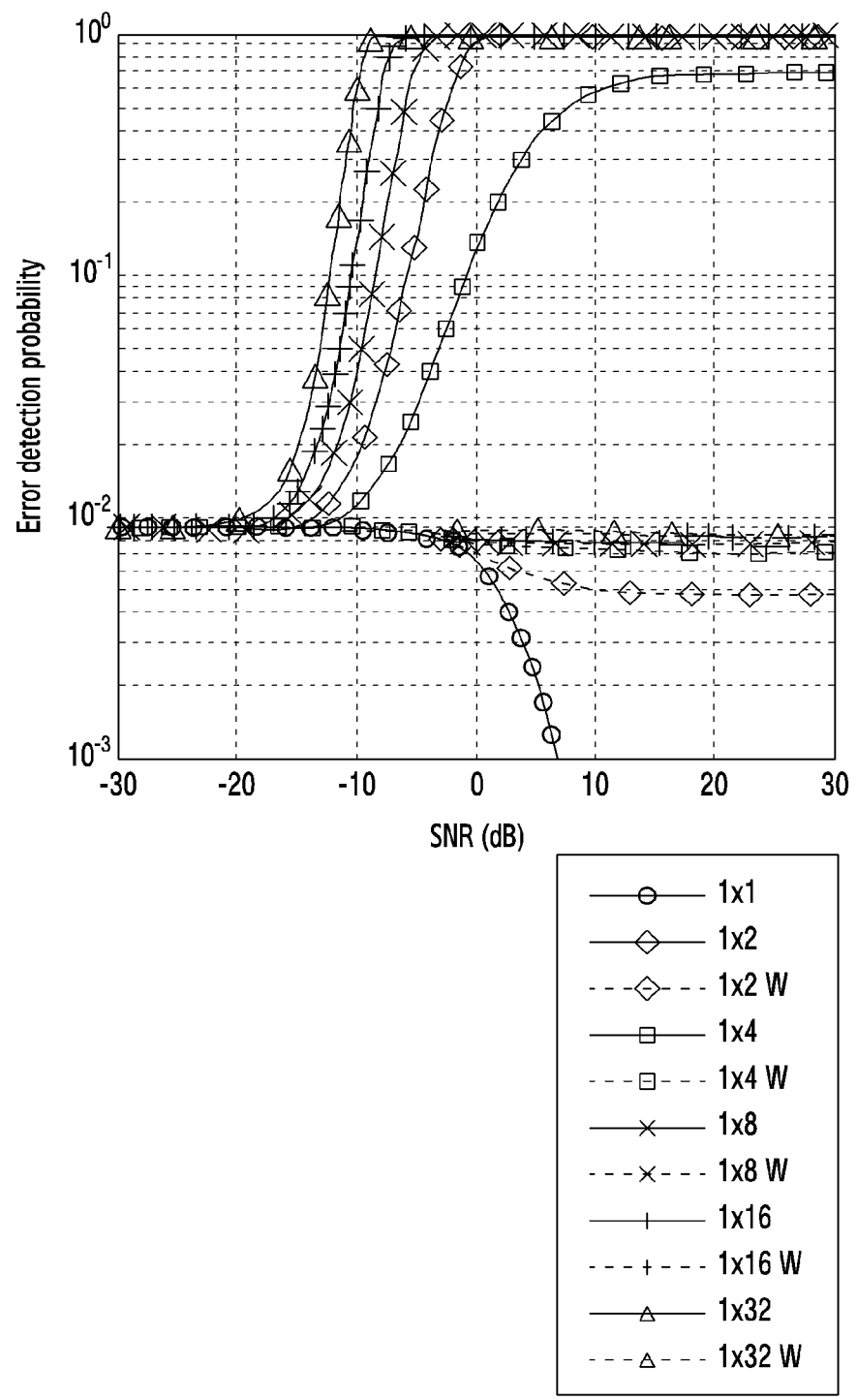
FIG. 16A illustrates an error detection probability according to spatial whitening when one RIM RS is received in an environment using eight candidate RIM RSs.
Figure 16B:
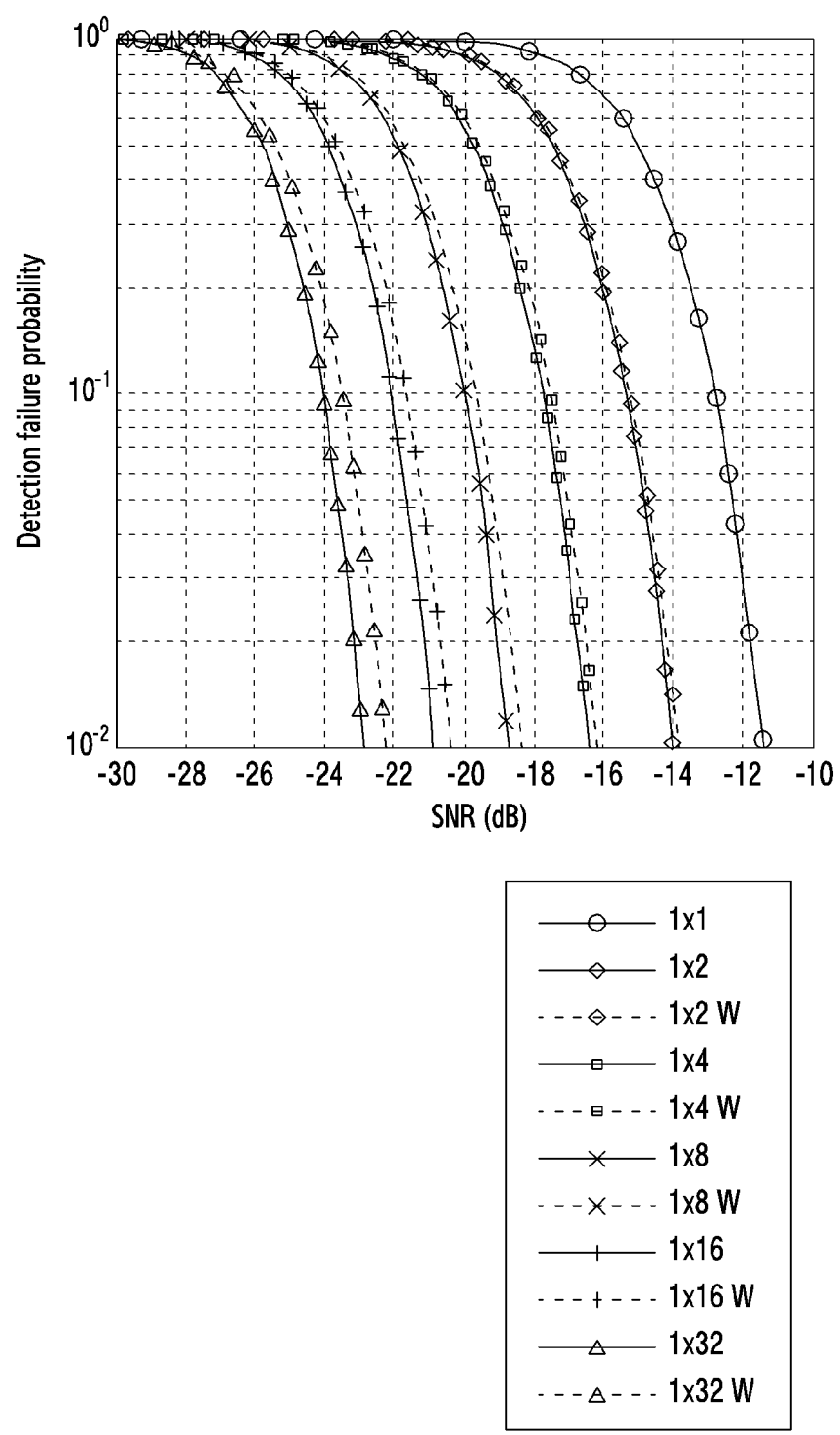
FIG. 16B illustrates a detection failure probability according to spatial whitening when one RIM RS is received in an environment using eight candidate RIM RSs.

FIG. 16A illustrates an error detection probability according to spatial whitening when one RIM RS is received in an environment using eight candidate RIM RSs. FIG. 16B illustrates a detection failure probability according to spatial whitening when one RIM RS is received in an environment using eight candidate RIM RSs.

Referring to FIG. 16A, when performing spatial whitening, it is identified that the error detection probability (1×2 W, 1×4 W, 1×8 W, 1×16 W, and 1×32 W) is maintained at 0.01 or less even though the SNR increases or the number of reception antennas increases.

Referring to FIG. 16B, it is identified that the detection failure probability (1×2 W, 1×4 W, 1×8 W, 1×16 W, and 1×32 W) (missing probability) slightly increases when performing spatial whitening compared to a case where spatial whitening is not performed. That is, in terms of the detection failure probability, it may be identified that there is slight performance deterioration when spatial whitening is performed, compared to the case where spatial whitening is not performed.

As described above, when at least one RIM RS is received, spatial whitening may reduce an error of misdetermining that a RIM RS not received is received. Accordingly, a detector using a plurality of reception antennas can exhibit a very high RIM RS detection performance.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system, the method comprising:
   identifying signals through a resource allocated for remote interference management (RIM) reference signals (RSS);
   detecting a plurality of candidate RSs, based on a channel power and a noise power of each of the signals;
   determining a first candidate RS having a maximum channel power value among the plurality of candidate RSs is received;
   determining threshold values based on cross-correlation values between the first candidate RS having the maximum channel power value and candidate RSs excluding the first candidate RS from the plurality of candidate RSs; and
   determining whether at least one candidate RS among the candidate RSs is received using ratios of channel power values of the candidate RSs to the maximum channel power value, and the threshold values.

2. The method of claim 1, wherein the detecting of the plurality of candidate RSs comprises:
   preprocessing the signals identified through a plurality of antennas; and
   adding the preprocessed signals for each candidate RS used for preprocessing.

3. The method of claim 1,
wherein a threshold value corresponding to a second candidate RS among the candidate RSs is determined, based on a cross-correlation value between the first candidate RS and the second candidate RS, and
wherein whether the second candidate RS is received is determined, based on a channel power value of the second candidate RS and the threshold value.

4. The method of claim 3, wherein the threshold value is determined based on a ratio between the cross-correlation value between the first candidate RS and the second candidate RS and an auto-correlation value of the first candidate RS.

5. The method of claim 3, wherein the the second candidate RS is determined as received in case that a ratio between the channel power value of the second candidate RS and the maximum channel power value exceeds the threshold value.

6. The method of claim 1, further comprising:
identifying the first candidate RS having the maximum channel power value among the plurality of candidate RSs.

7. The method of claim 6, further comprising:
correcting an index for detection for a second candidate RS, based on a cross-correlation value between the first candidate RS and the second candidate RS; and
determining whether the second candidate RS is detected using the corrected index.

8. The method of claim 7, wherein the correcting of the index comprises removing a contribution by the cross-correlation value from a channel power value of the second candidate RS.

9. The method of claim 1, wherein the detecting of the plurality of candidate RSs based on the channel power and the noise power of each of the signals comprises:
removing the plurality of candidate RSs from the signals;
converting a signal obtained by removing the plurality of candidate RSs into a time-domain signal;
determining first channel power and first noise power from a level of the time-domain signal; and
identifying whether a ratio between the first channel power and the first noise power exceeds a threshold value.

10. The method of claim 1, wherein the identifying of the signals comprises:
estimating a covariance matrix for the signals; and
performing spatial whitening on the signals based on the covariance matrix.

11. A base station in a wireless communication system, the base station comprising:
a transceiver; and
at least one processor coupled with the transceiver and configured to:
identify signals through a resource allocated for remote interference management (RIM) reference signals (RSs),
detect a plurality of candidate RSs based on a channel power and a noise power of each of the signals,
determine a first candidate RS having a maximum channel power value among the plurality of candidate RSs is received,
determine threshold values based on cross-correlation values between the first candidate RS having the maximum channel power value and candidate RSs excluding the first candidate RS from the plurality of candidate RSs, and
determine whether at least one candidate RS among the candidate RSs is received using ratios of channel power values of the candidate RSs to the maximum channel power value, and the threshold values.

12. The base station of claim 11, wherein the at least one processor is configured to:
preprocess the signals identified through a plurality of antennas, and
add the preprocessed signals for each candidate RS used for preprocessing.

13. The base station of claim 11, wherein
a threshold value corresponding to a second candidate RS among the candidate RSs is determined, based on a cross-correlation value between the first candidate RS and the second candidate RS, and
wherein whether the second candidate RS is received is determined, based on a channel power value of the second candidate RS and the threshold value.

14. The base station of claim 13, wherein the threshold value is determined based on a ratio between the cross-correlation value between the first candidate RS and the second candidate RS and an auto-correlation value of the first candidate RS.

15. The base station of claim 13, wherein the second candidate RS is determined as received in case that a ratio between the channel power value of the second candidate RS and the maximum channel power value.

16. The base station of claim 11, wherein the at least one processor is configured to:
identify the first candidate RS having the maximum channel power value among the plurality of candidate RSs.

17. The base station of claim 16, wherein the at least one processor is configured to:
correct an index for detection for a second candidate RS, based on a cross-correlation value between the first candidate RS and the second candidate RS, and
determine whether the second candidate RS is detected using the corrected index.

18. The base station of claim 17, wherein the at least one processor is configured to remove a contribution by the cross-correlation value from a channel power value of the second candidate RS.

* * * * *